United States Patent
Babaei et al.

(10) Patent No.: US 10,595,358 B2
(45) Date of Patent: Mar. 17, 2020

(54) SEMI-PERSISTENT SCHEDULING IN A WIRELESS NETWORK

(71) Applicant: Ofinno Technologies, LLC, Herndon, VA (US)

(72) Inventors: Alireza Babaei, Fairfax, VA (US); Esmael Dinan, Herndon, VA (US); Kyungmin Park, Herndon, VA (US); Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 15/972,041

(22) Filed: May 4, 2018

(65) Prior Publication Data

US 2018/0324889 A1  Nov. 8, 2018

Related U.S. Application Data

(60) Provisional application No. 62/501,653, filed on May 4, 2017.

(51) Int. Cl.
  *H04W 76/27* (2018.01)
  *H04W 72/04* (2009.01)
  (Continued)

(52) U.S. Cl.
  CPC ........... *H04W 76/27* (2018.02); *H04L 5/0094* (2013.01); *H04L 5/0098* (2013.01); *H04W 8/26* (2013.01); *H04W 72/042* (2013.01)

(58) Field of Classification Search
  CPC ... H04L 5/0094; H04L 5/0098; H04L 5/0042; H04L 5/0044; H04L 5/0053; H04L 5/00;
  (Continued)

(56) References Cited

U.S. PATENT DOCUMENTS 8,379,585 B2 * 2/2013 Lee .................. H04W 48/12
  370/329
8,804,645 B2 * 8/2014 Kim .................. H04W 72/0413
  370/329

(Continued)

OTHER PUBLICATIONS

3GPP TS 36.211 V14.2.0 (Mar. 2017); 3rd Generation Partnership Project; Technical Specification Group Radio Access Network; Evolved Universal Terrestrial Radio Access (E-UTRA); Physical channels and modulation (Release 14).

(Continued)

*Primary Examiner* — Man U Phan
(74) *Attorney, Agent, or Firm* — David Grossman; Kavon Nasabzadeh; Philip Smith

(57) ABSTRACT

A wireless device receives, one or more radio resource control messages comprising first periodic resource allocation configuration parameters comprising a first periodicity parameter of a first periodic resource allocation. Downlink control information indicating activation of the first periodic resource allocation is received. The downlink control information comprises one or more first fields. A plurality of transport blocks are transmitted via radio resources associated with the first periodic resource allocation. A time interval between two subsequent transmission occasions of the first periodic resource allocation is based on the one or more first fields and the first periodicity parameter.

18 Claims, 22 Drawing Sheets

(51) Int. Cl.
*H04W 8/26* (2009.01)
*H04L 5/00* (2006.01)
(58) Field of Classification Search
CPC ..... H04W 76/27; H04W 72/042; H04W 8/26; H04W 72/04
USPC .......................................................... 370/336
See application file for complete search history.

(56) References Cited

U.S. PATENT DOCUMENTS

| | | | | |
|---|---|---|---|---|
| 9,042,327 | B2* | 5/2015 | Yang | H04L 1/1825 370/329 |
| 9,295,044 | B2* | 3/2016 | Novak | H04W 72/042 |
| 9,860,887 | B2* | 1/2018 | Yi | H04L 5/001 |
| 10,172,181 | B2* | 1/2019 | Kim | H04W 36/36 |
| 2011/0170495 | A1* | 7/2011 | Earnshaw | H04W 72/02 370/329 |
| 2015/0282210 | A1* | 10/2015 | Li | H04W 76/14 455/436 |
| 2016/0127955 | A1* | 5/2016 | Damnjanovic | H04W 36/0072 370/331 |
| 2017/0019887 | A1* | 1/2017 | Jiang | H04W 72/042 |
| 2017/0099624 | A1* | 4/2017 | Baghel | H04W 76/14 |
| 2017/0289733 | A1* | 10/2017 | Rajagopal | H04W 4/70 |

OTHER PUBLICATIONS

3GPP TS 36.212 V14.2.0 (Mar. 2017); 3rd Generation Partnership Project; Technical Specification Group Radio Access Network; Evolved Universal Terrestrial Radio Access (E-UTRA); Multiplexing and channel coding (Release 14).
3GPP TS 36.213 V14.2.0 (Mar. 2017); 3rd Generation Partnership Project; Technical Specification Group Radio Access Network; Evolved Universal Terrestrial Radio Access (E-UTRA); Physical layer procedures (Release 14).
3GPP TS 36.300 V14.2.0 (Mar. 2017); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.2.1 (Mar. 2017); 3rd Generation Partnership Project; Technical Specification Group Radio Access Network; Evolved Universal Terrestrial Radio Access (E-UTRA); Medium Access Control (MAC) protocol specification (Release 14).
R1-1704222; 3GPP TSG RAN WG1 Meeting #88b; Spokane, USA, Apr. 3-7, 2017; Agenda Item: 8.1.3.3.4; Source: Huawei, HiSilicon; Title: Grant-free transmission for UL URLLC; Document for: Discussion and Decision.
R1-1704223; 3GPP TSG RAN WG1 Meeting #88bis; Spokane, USA, Apr. 3-7, 2017; Agenda Item: 8.1.3.1.5; Source: Huawei, HiSilicon; Title: HARQ indication design for UL GF transmission; Document for: Discussion and Decision.
R1-1704428; 3GPP TSG RAN WG1 Meeting #88bis; Spokane, USA Apr. 3-7, 2017; Source: ZTE, ZTE Microelectronics; Title: HARQ for URLLC UL Grant-free transmission; Agenda item: 8.1.3.3.4; Document for: Discussion and Decision.
R1-1704481; 3GPP TSG RAN WG1 Meeting #88; Spokane, USA Apr. 3-7, 2017; Agenda Item: 8.1.3.3.4; Source: Fujitsu; Title: Discussions on HARQ for grant-free UL URLLC; Document for: Discussion/Decision.
R1-1704585; 3GPP TSG RAN WG1 Meeting #88bis; Spokane, USA, Apr. 3-7, 2017; Source: CATT; Title: Further details of UL grant-free transmission for URLLC; Agenda Item: 8.1.3.3.4; Document for: Discussion and Decision.
R1-1704630; 3GPP TSG RAN WG1 Meeting #88bis; Spokane, USA, Apr. 3-7, 2017; Source: Guangdong OPPO Mobile Telecom; Title: Discussions on uplink grant-free transmission; Agenda Item: 8.1.3.3.4; Document for: Discussion and Decision.

R1-1704631; 3GPP TSG RAN WG1 Meeting #88bis; Spokane, USA, Apr. 3-7, 2017; Source: Guangdong OPPO Mobile Telecom; Title: HARQ for uplink grant-free transmission; Agenda Item: 8.1.3.3.4; Document for: Discussion and Decision.
R1-1704657; 3GPP TSG RAN WG1 Meeting #88 Bis; Spokane, WA, Apr. 3-7, 2017; Source: DISH Network, Thales, Fraunhofer IIS, Hughes Network Systems; Title: On Uplink Grant Free Transmission; Document for: Discussion.
R1-1704762; 3GPP TSG RAN1 WG Meeting #88bis; Spokane, USA Apr. 3-7, 2017; Source: Intel Corporation; Title: Grant-free UL transmission scheduling and HARQ aspects; Agenda item: 8.1.3.3.4; Document for: Discussion and Decision.
R1-1705177; 3GPP TSG RAN WG1 Meeting #88bis; Spokane, USA Apr. 3-7, 2017; Source: Panasonic; Title: Repetition/retransmission of UL grant-free; Agenda Item: 8.1.3.3.4; Document for: Discussion, Decision.
R1-1705205; 3GPP TSG RAN WG1 Meeting #88bis; Spokane, USA Apr. 3-7, 2017; Agenda Item: 8.1.3.3.4; Source: Sony; Title: On using uplink grant free resource and power control for URLLC; Document for: Discussion / decision.
R1-1705406; 3GPP TSG RAN WG1 Meeting #88bis; Spokane, USA, Apr. 3-7, 2017; Agenda Item: 8.1.3.3.4; Source: Samsung; Title: Grant-free UL transmission for URLLC; Document for: Discussion and Decision.
R1-1705413; 3GPP TSG RAN WG1 Meeting #88b; Spokane, Washington, USA, Apr. 3-7, 2017; Agenda Item: 8.1.3.3.7; Source: Samsung; Title: Grant free scheduling request; Document for: Discussion and Decision.
R1-1705463; 3GPP TSG RAN WG1 Meeting #88bis; Spokane, USA Apr. 3-7, 2017; Agenda item: 8.1.3.3.4; Source: China Telecom; Title: UL grant-free transmission for URLLC; Document for: Discussion.
R1-1705530; 3GPP TSG RAN WG1 Meeting #88bis; Spokane, WA, USA, Apr. 3-7, 2017; Source: NICT; Title: UL grant free transmission for URLLC; Agenda Item: 8.1.3.2.5; Document for: Discussion and Decision.
R1-1705654; 3GPP TSG RAN WG1 Meeting #88bis; Spokane, USA Apr. 3-7, 2017; Agenda Item: 8.1.3.3.4; Source: Lenovo, Motorola Mobility; Title: UL grant-free transmission for URLLC; Document for: Discussion.
R1-1705785; 3GPP TSG-RAN WG1 Meeting #88bis; Spokane, USA Apr. 3-7, 2017; Agenda item: 8.1.3.3.4 URLLC-specific aspects; Source: Institute for Information Industry (III); Title: On Uplink Grant Free Resource Configuration; Document for: Discussion and Decision.
R1-1706230; RAN1 #88bis, Spokane, US; AI 8.1.3.4; WF on UE identification for UL SPS; Ericsson, Lenovo, MediaTek.
R1-1706231; RAN1 #88bis, Spokane, US; AI 8.1.3.3.4; WF on UL SPS configuration; Ericsson, NTT DoCoMo.
R1-1706495; 3GPP TSG RAN WG1 #88bis; Spokane, USA Apr. 3-7, 2017; Agenda item: 8.1.3.3.4; WF on procedures of grant-free transmission; Huawei, HiSilicon, CATT, Convida Wireless.
R1-1706810; RAN1 #88bis, Spokane, US; AI 8.1.3.3.4; WF on UL grant-free configuration; Ericsson, Sharp labs.
R1-1706855; 3GPP TSG RAN WG1 #88bis; Spokane, USA Apr. 3-7, 2017; Agenda item: 8.1.3.3.4; WF on procedures of grant-free transmission; Huawei, HiSilicon, GATT, CMCC, Convida Wireless, ZTE, ZTE Microelectronics, OPPO, CATR, Orange, Intel, MediaTek, Nokia, Xiaomi.
R2-1700835; 3GPP TSG-RAN WG2 #97; Athens, Greece, Feb. 13-17, 2017; Update of R2-1700436; Agenda Item: 10.2.1.4; Source: Ericsson; Title: URLLC aspects for grant-free UL transmission in NR; Document for: Discussion, Decision.
R2-1701550; 3GPP TSG-RAN WG2 NR#97; Athens, Greece, Feb. 13-17, 2017; (Revision of R2-1700296); Agenda item: 10.2.1.2; Source: Samsung; Title: MAC to Support Multiple Service Verticals and Numerologies; Document for: Discussion and Decision.
R2-1702514; 3GPP TSG-RAN WG2 Meeting #97bis; Spokane, USA, Apr. 3-7, 2017; Source: vivo; Title: UL grant-free transmission; Agenda Item: 10.3.1.5; Document for: Discussion and Decision.

(56) References Cited

OTHER PUBLICATIONS

R2-1702548; 3GPP TSG-RAN2 Meeting #97bis; Spokane, USA, Apr. 3-7, 2017; Agenda Item: 10.3.1.5; Source: OPPO; Title: SPS-like scheme in NR; Document for: Discussion, Decision.

R2-1702666; 3GPP TSG-RAN WG2 #97bis; Spokane, USA, Apr. 3-7, 2017; Agenda Item: 10.3.1.6; Source: Ericsson; Title: HARQ handling for SPS UL; Document for: Discussion, Decision.

R2-1702754; 3GPP TSG-RAN WG2 #97bis; Spokane, USA, Apr. 3-7, 2017; Agenda Item: 10.3.1.5; Source: Ericsson; Title: Semi Persistent Scheduling in NR; Document for: Discussion, Decision.

R2-1703123; 3GPP TSG-RAN WG2 Meeting #97bis; Spokane, USA, Apr. 3-7, 2017; Source: CATT; Title: Discussion on SPS; Agenda Item: 10.3.1.5; Document for: Discussion and Decision.

R2-1703448; 3GPP TSG-RAN WG2 Meeting #97bis; Spokane, USA, Apr. 3-7, 2017; Title: SPS enhancements for VoIP; Source: Intel Corporation; Agenda item: 10.3.1.8; Document for: Discussion and Decision.

R2-1703489; 3GPP TSG-RAN WG2 Meeting #97bis; Spokane, USA, Apr. 3-7, 2017; Agenda Item: 9.2.2 (LTE_STTlandPT); Source: LG Electronics Inc.; Title: SPS with sTTI; Document for: Discussion and Decision.

R2-1703645; 3GPP TSG-RAN WG2 Meeting #97bis; Spokane, USA, Apr. 3-7, 2017; Agenda Item: 9.2.2; Source: Huawei, HiSilicon; Title: Introduction of SPS into short TTI; Document for: Discussion and Decision.

R1-166167; 3GPP TSG RAN WG1 Meeting #86; Gothenburg, Sweden, Aug. 22-26, 2016; Agenda Item: 7.2.2.4.1; Source: Huawei, HiSilicon; Title: SPS enhancement for V2V; Document for: Discussion and decision.

R2-168702; 3GPP TSG-RAN WG2 #96; Reno, Nevada, USA, Nov. 14-18, 2016; Agenda Item: 8.13.2; Source: Ericsson, Interdigital, ITL; Title: Sidelink SPS Configuration; Document for: Discussion, Decision.

* cited by examiner

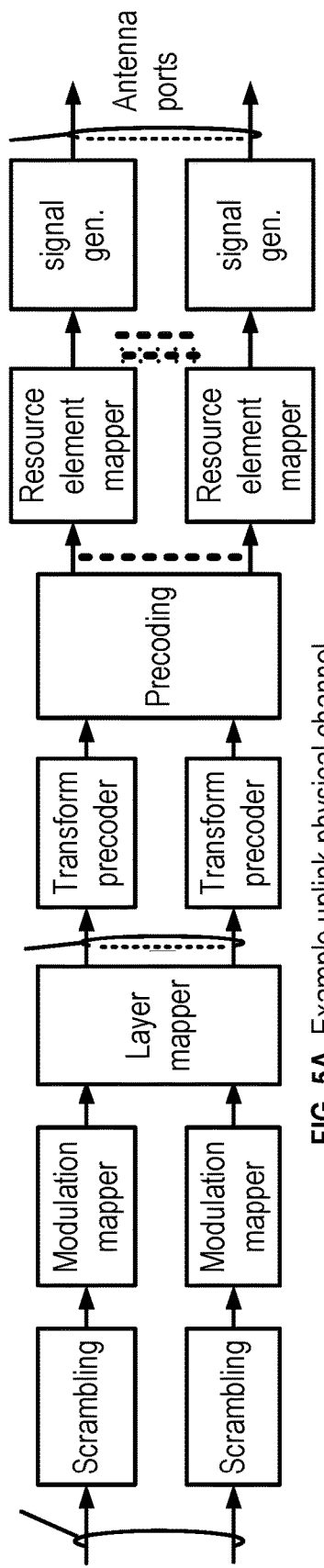
FIG. 5A Example uplink physical channel
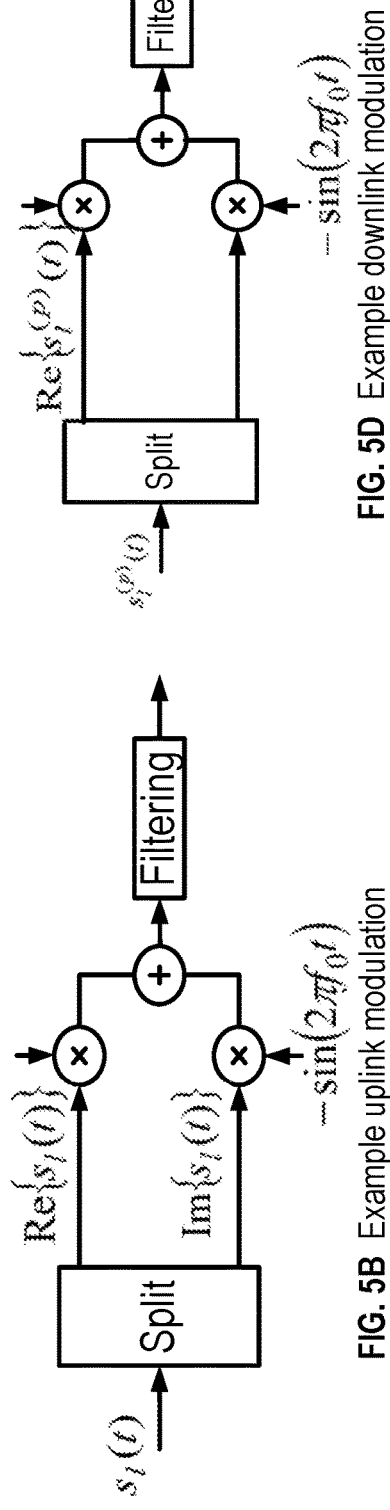
FIG. 5B Example uplink modulation
FIG. 5D Example downlink modulation
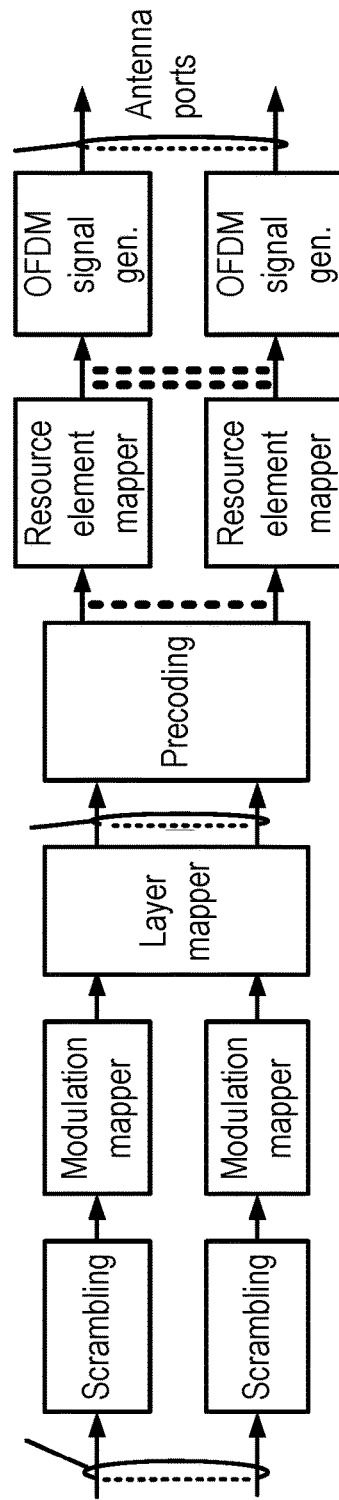
FIG. 5C Example downlink physical channel Dual-Connectivity- two MAC entities at UE side

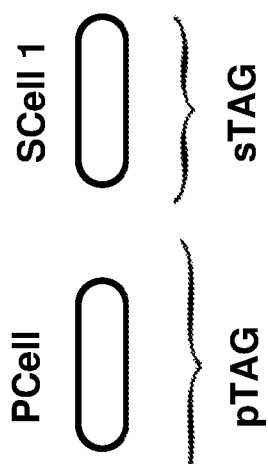
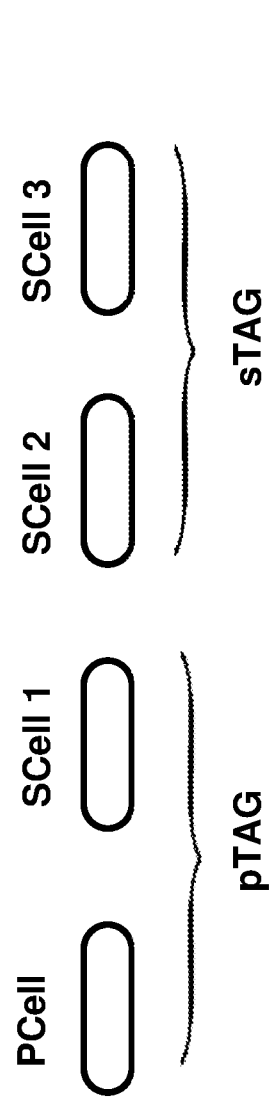
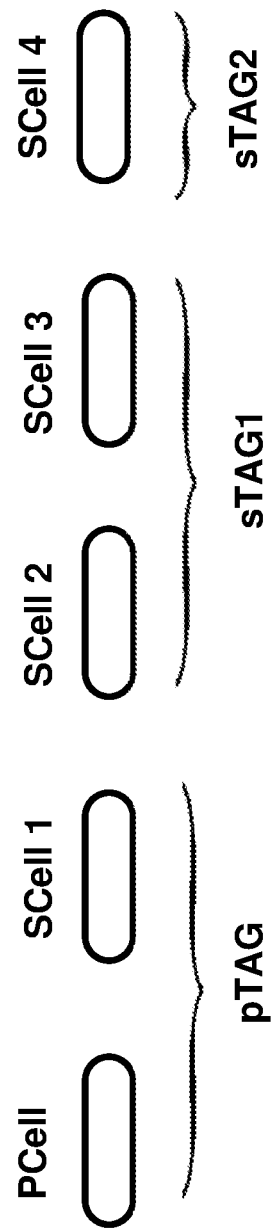
FIG. 8

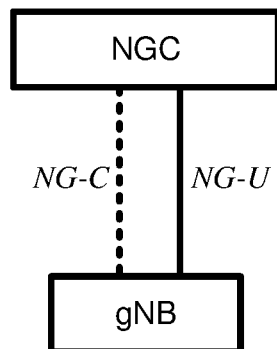
FIG. 10A gNB connected to NGC
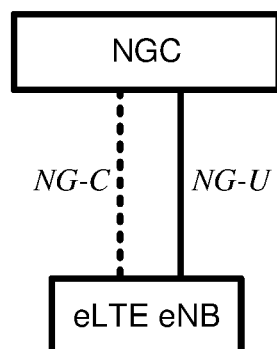
FIG. 10B eLTE eNB connected to NGC

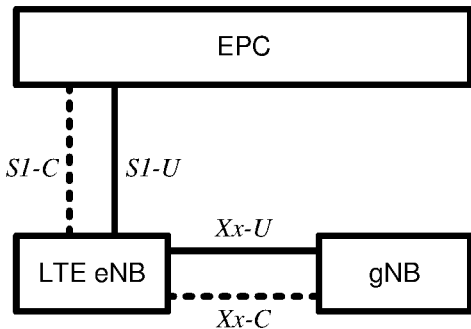

FIG. 11A LTE eNB connected to EPC with non-standalone gNB.
gNB user plane connected to EPC via LTE eNB.

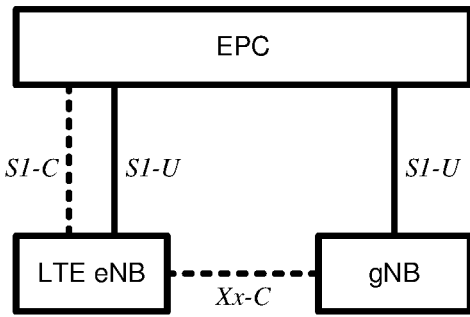

FIG. 11B LTE eNB connected to EPC with non-standalone gNB.
gNB user plane connected to EPC directly.

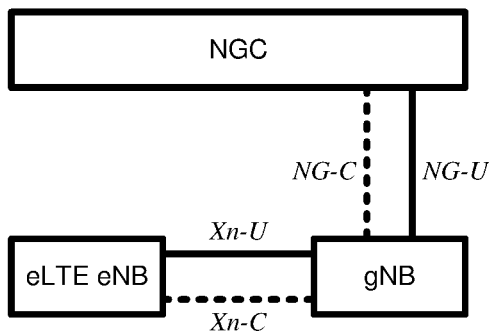

FIG. 11C gNB connected to NGC with non-standalone eLTE eNB.
eLTE eNB user plane connected to NGC via gNB.

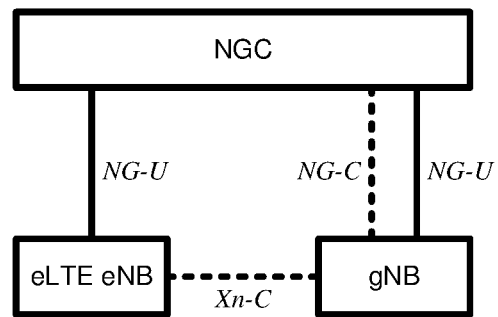

FIG. 11D gNB connected to NGC with non-standalone eLTE eNB.
eLTE eNB user plane connected to NGC directly.

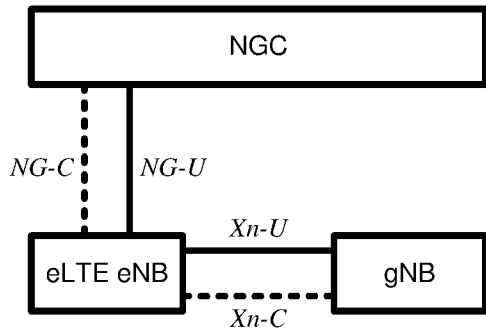

FIG. 11E eLTE eNB connected to NGC with non-standalone gNB.
gNB user plane connected to NGC via eLTE eNB.

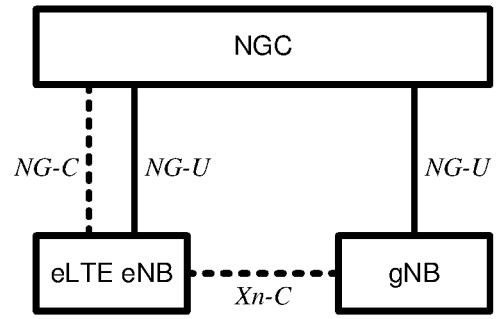

FIG. 11F eLTE eNB connected to NGC with non-standalone gNB.
gNB user plane connected to NGC directly.

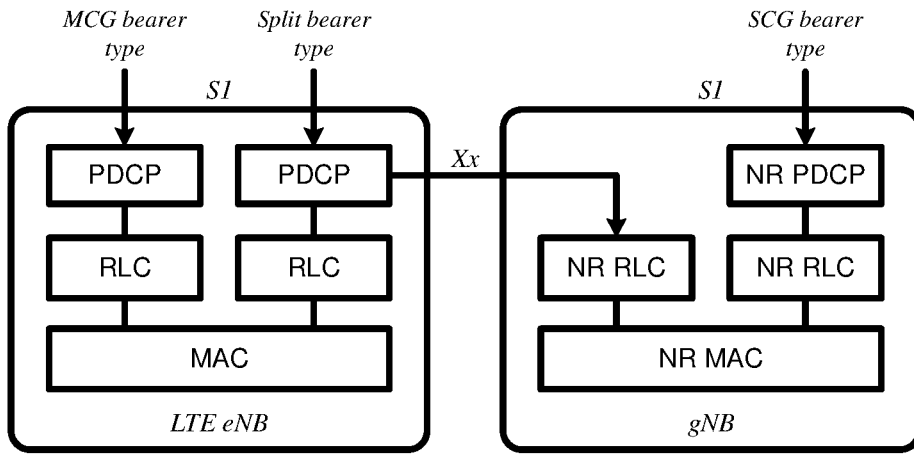
FIG. 12A Radio protocol architecture for split bearer and SCG bearer. LTE eNB connected to EPC with non-standalone gNB.
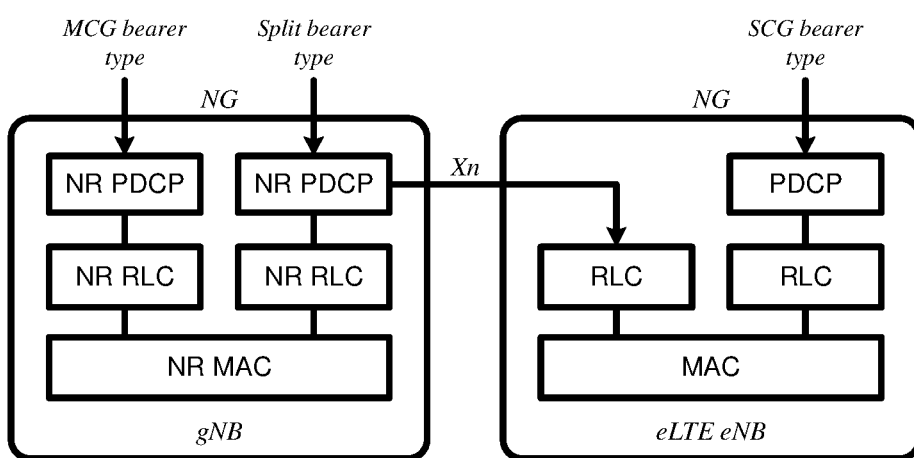
FIG. 12B Radio protocol architecture for split bearer and SCG bearer. gNB connected to NGC with non-standalone eLTE eNB.
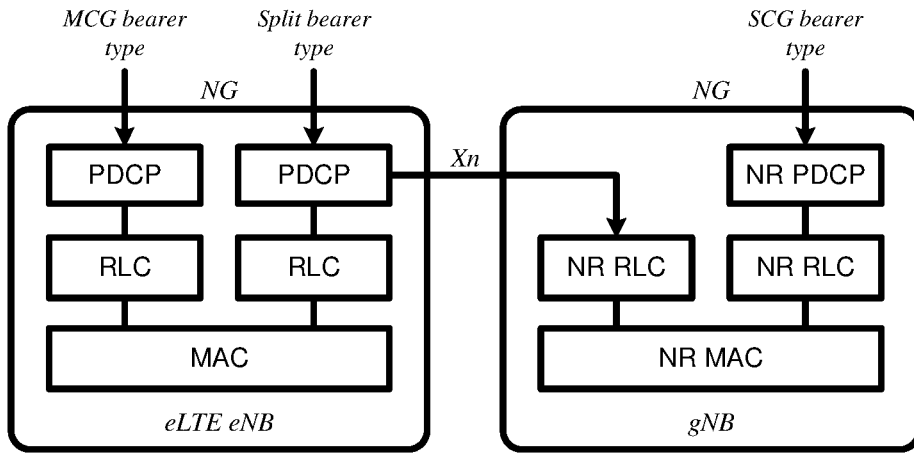
FIG. 12C Radio protocol architecture for split bearer and SCG bearer. eLTE eNB connected to NGC with non-standalone gNB.

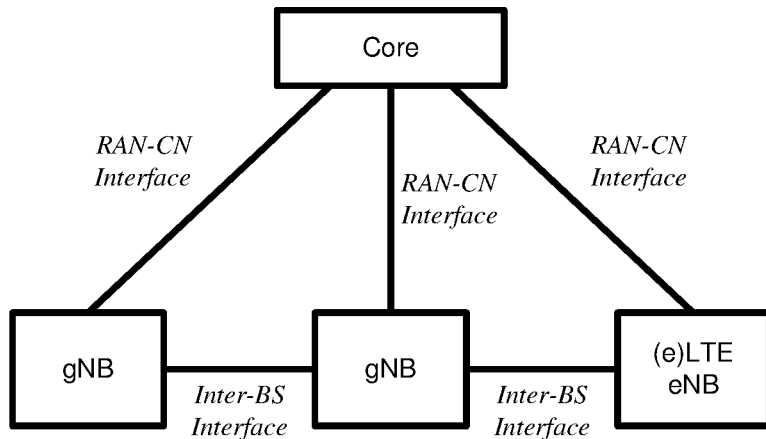
FIG. 13A Non-centralized deployment
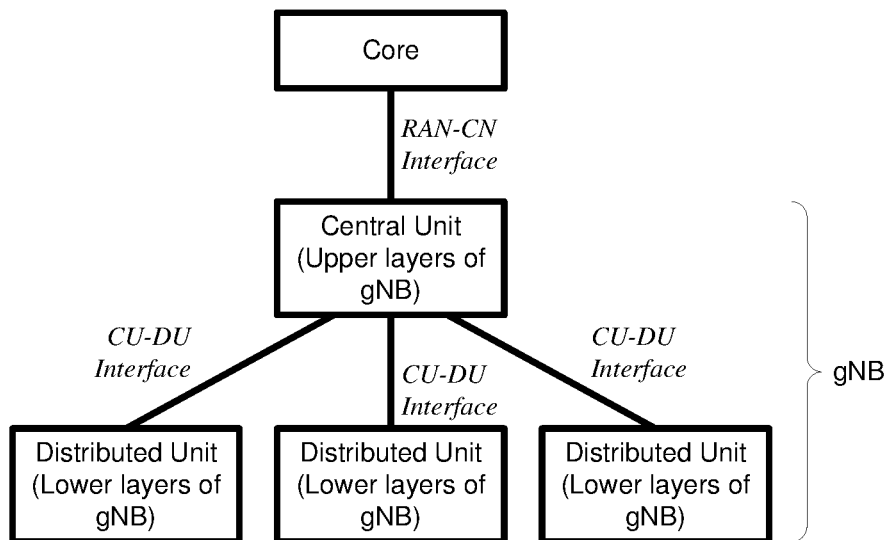
FIG. 13B Centralized deployment Transmit, by a base station, radio resource control message(s) comprising 1st periodic resource allocation configuration parameters comprising a 1st periodicity parameter of a 1st periodic resource allocation
1910

Transmit a downlink control information indicating activation of the 1st periodic resource allocation, wherein the downlink control information comprises first field(s)
1920

Receive transport blocks via radio resources associated with the 1st periodic resource allocation, where a time interval between two subsequent transmission occasions of the 1st periodic resource allocation is based on the first field(s) and the first periodicity parameter
1930

FIG. 19

Transmit, by a base station, radio resource control message(s) comprising 1st periodic resource allocation configuration parameters comprising a 1st periodicity parameter of a 1st periodic resource allocation; and a 2nd parameter
2210

Receive transport blocks via radio resources associated with the 1st periodic resource allocation, where a time interval between two subsequent transmission occasions of the 1st periodic resource allocation is based on the 2nd parameter and the first periodicity parameter
2220

FIG. 22

SEMI-PERSISTENT SCHEDULING IN A WIRELESS NETWORK

This application claims the benefit of U.S. Provisional Application No. 62/501,653, filed May 4, 2017, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 10A and FIG. 10B are example diagrams for interfaces between a 5G core network (e.g. NGC) and base stations (e.g. gNB and eLTE eNB) as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 12A, FIG. 12B, and FIG. 12C are example diagrams for radio protocol structures of tight interworking bearers as per an aspect of an embodiment of the present invention.

FIG. 13A and FIG. 13B are example diagrams for gNB deployment scenarios as per an aspect of an embodiment of the present invention.

FIG. 19 is a flow diagram of an aspect of an embodiment of the present disclosure.

FIG. 22 is a flow diagram of an aspect of an embodiment of the present disclosure.

DETAILED DESCRIPTION OF EMBODIMENTS

Figure 1:
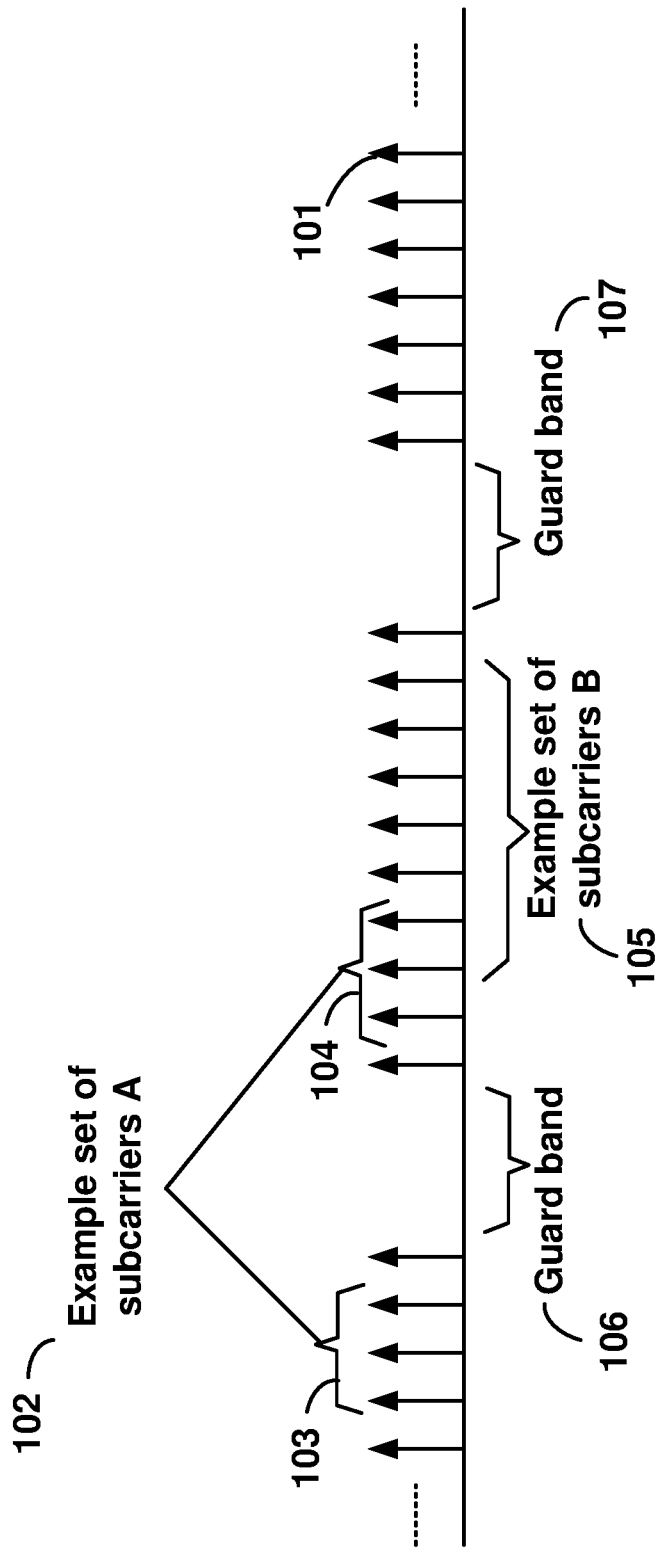
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to periodic resource allocation in a multicarrier communication system.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time interval TB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
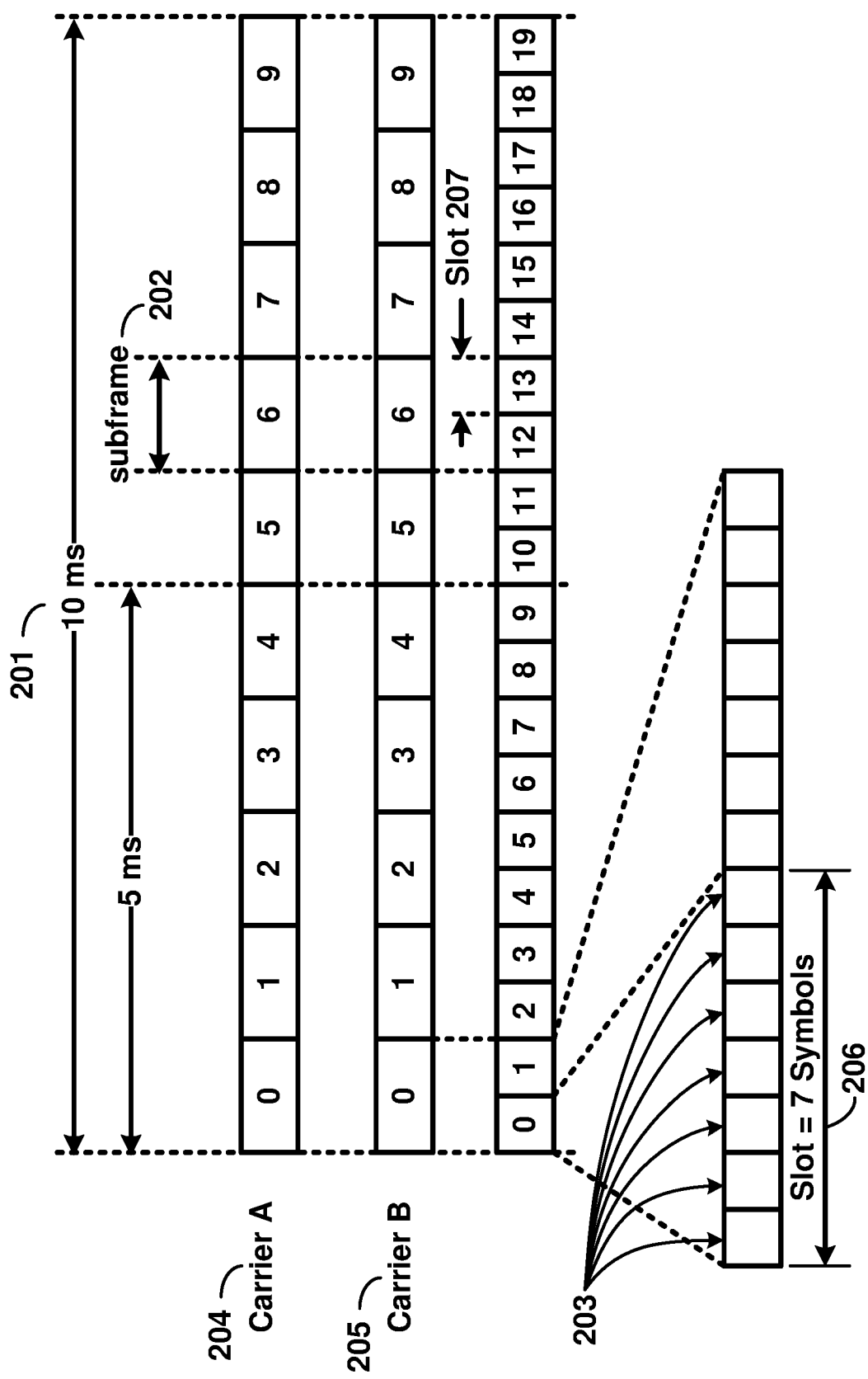
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
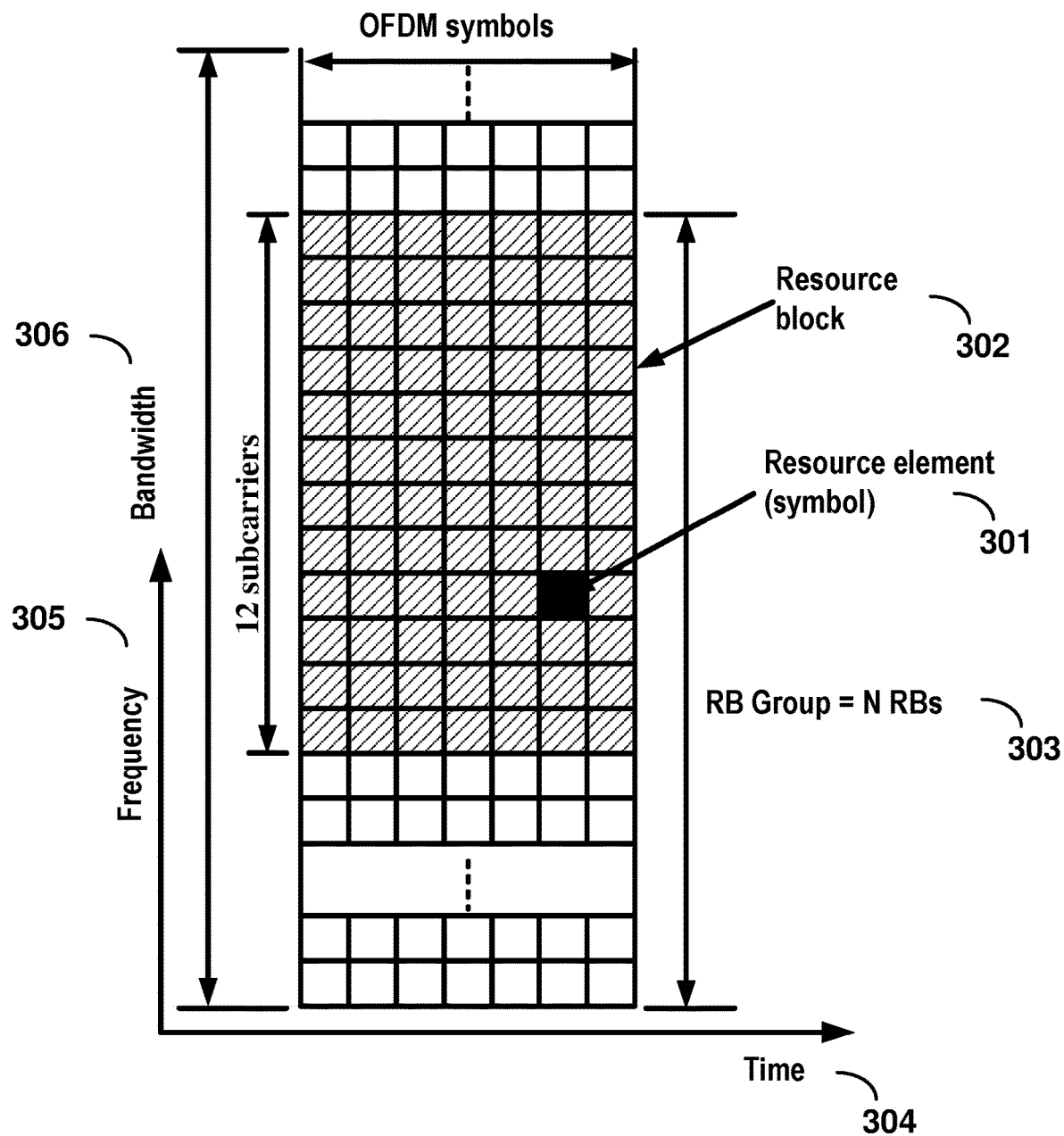
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
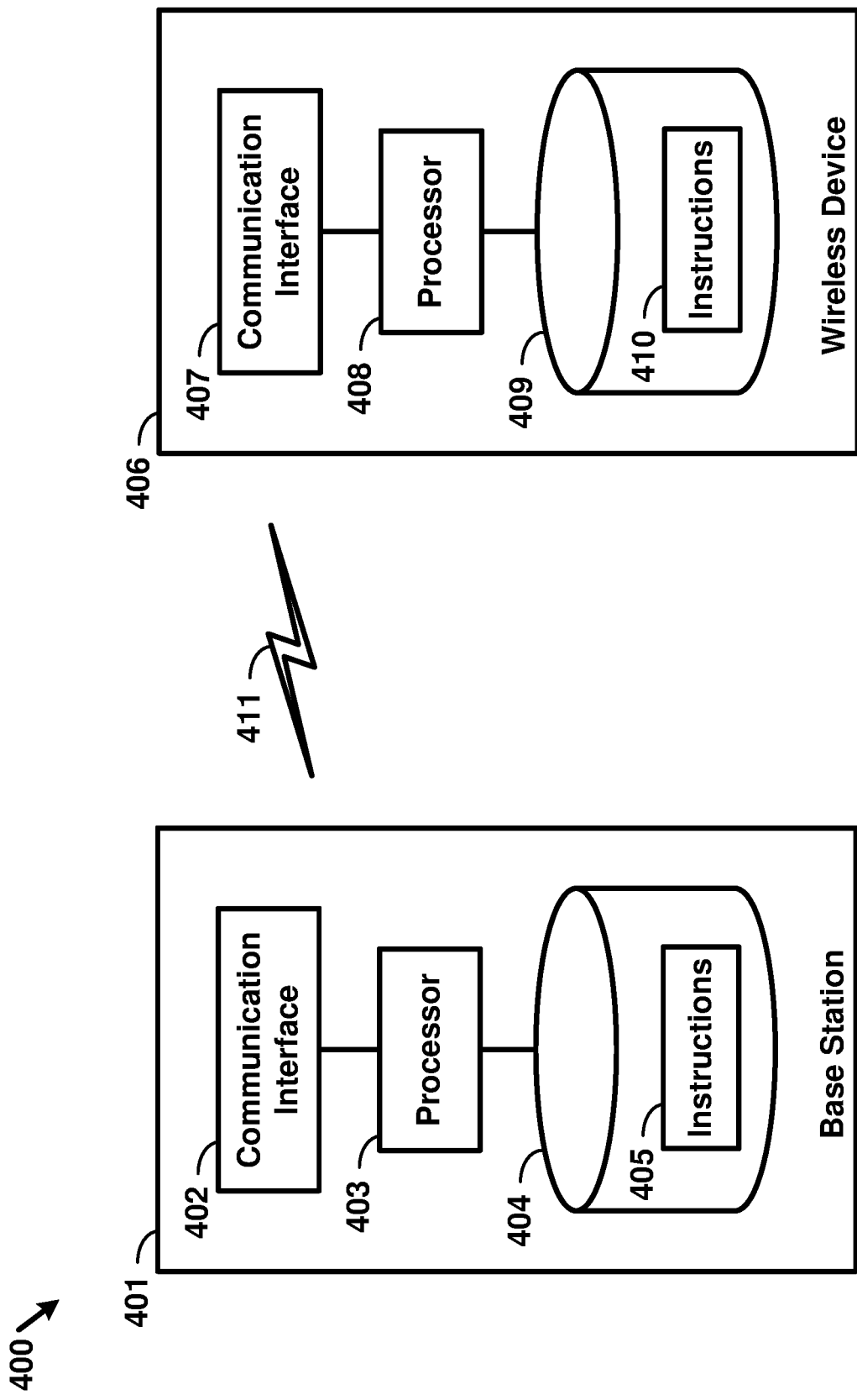
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/ handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
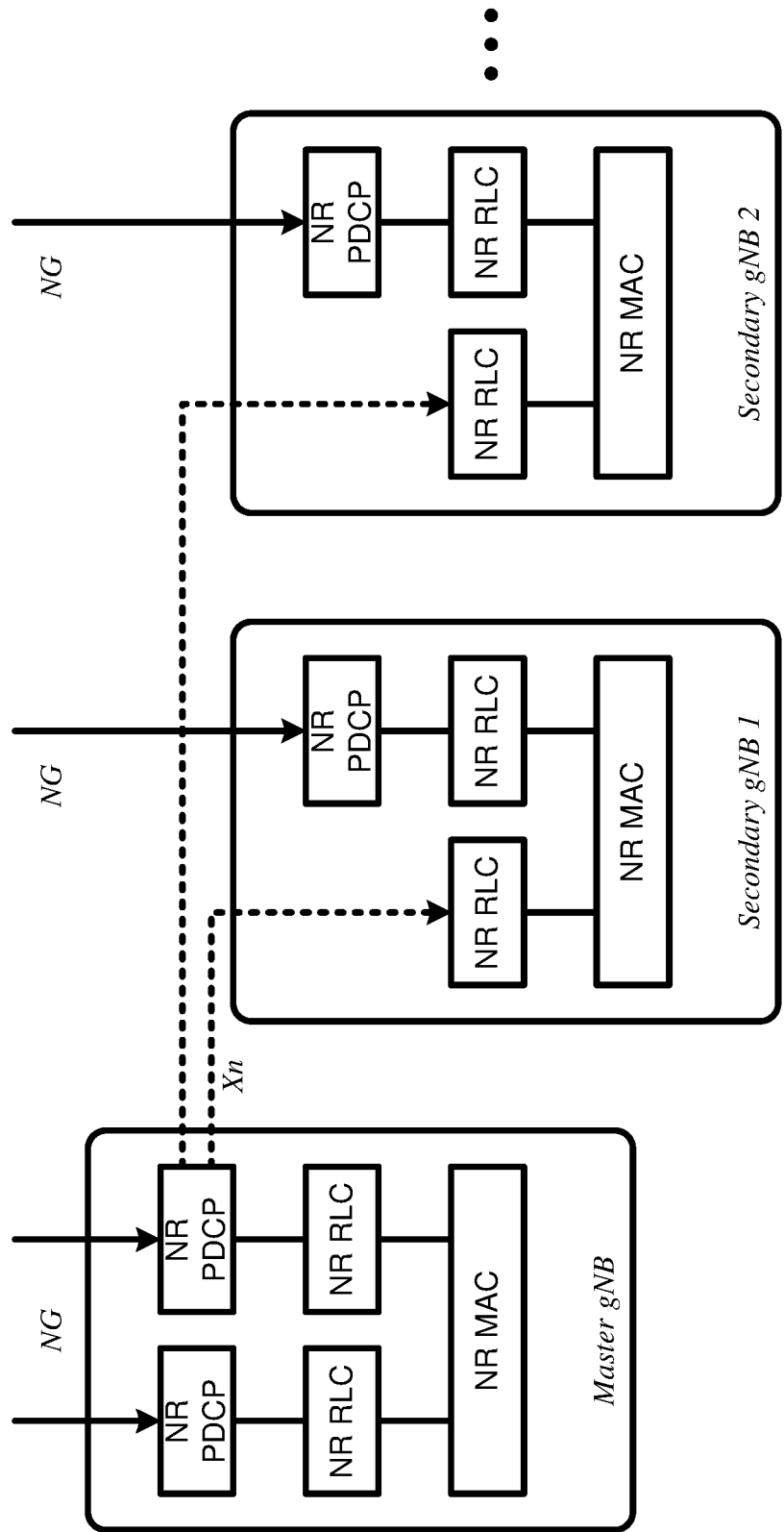
FIG. 6 is an example diagram for a protocol structure with multi-connectivity as per an aspect of an embodiment of the present invention.
Figure 7:
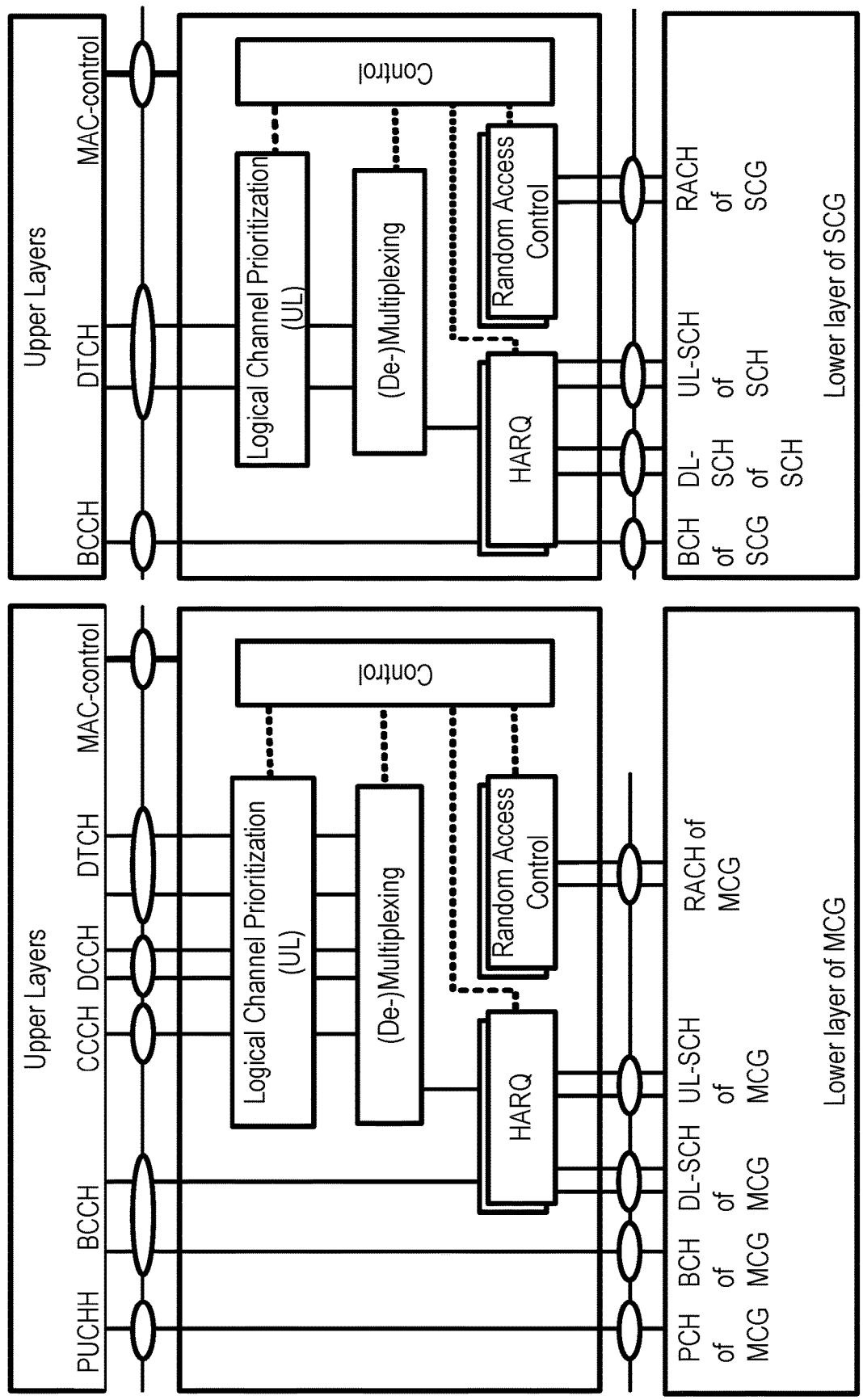
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE;

upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
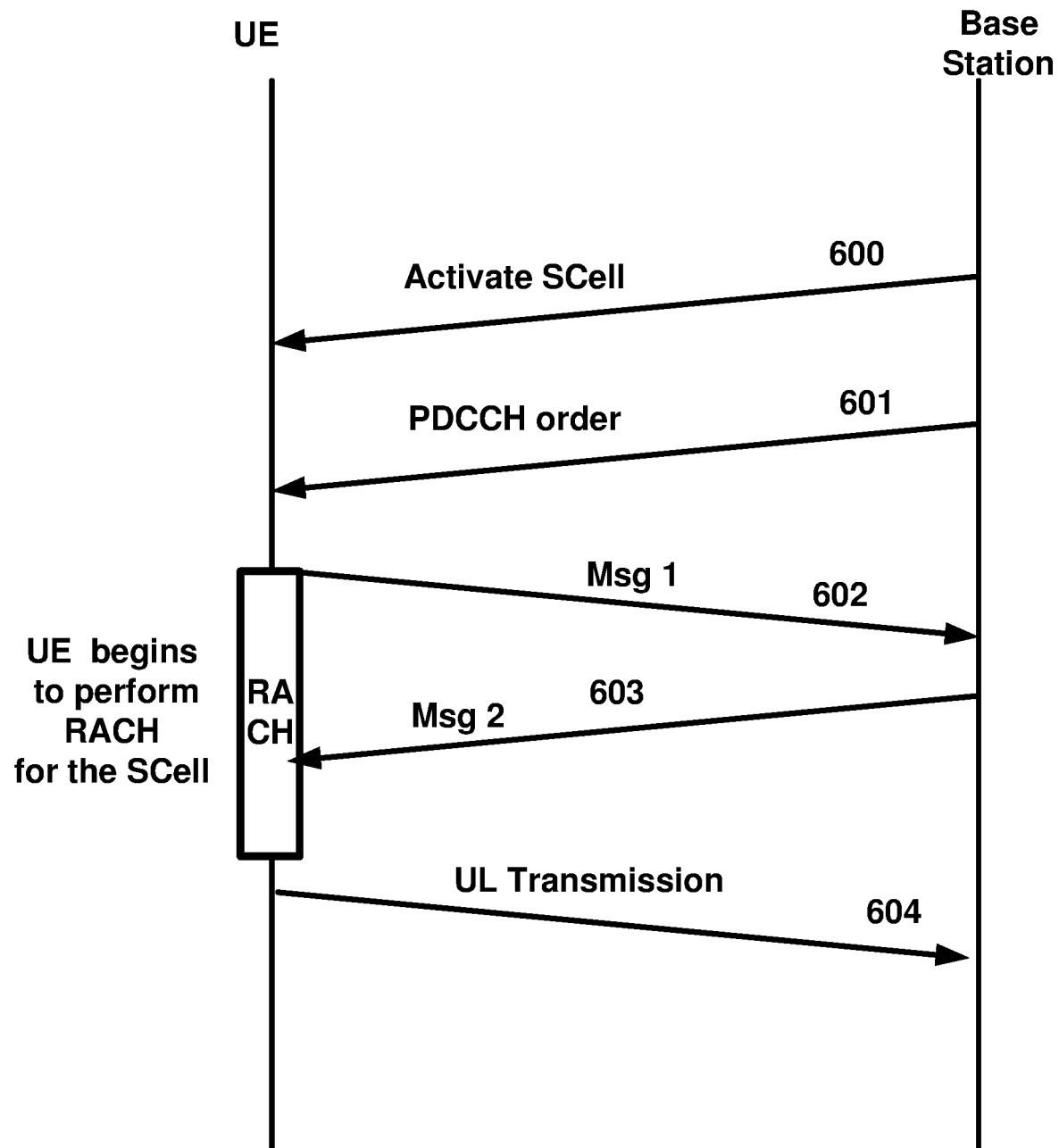
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
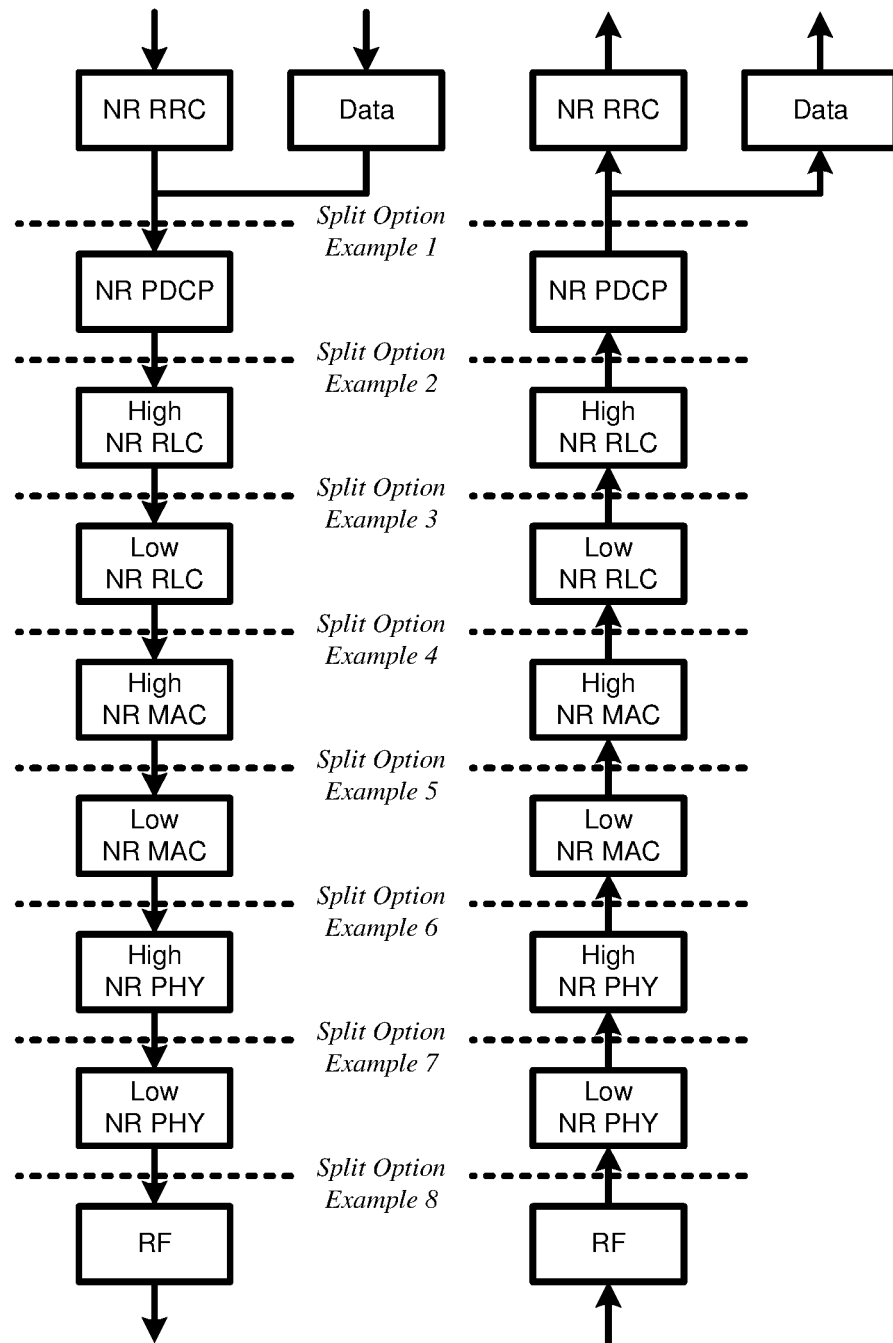
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, a base station may configure a wireless device with a plurality of logical channels. A logical channel may correspond to at least one data radio bearer and/or at least one signaling radio bearer. A radio bearer and/or a signaling bearer may be associated with a quality of service (QoS) requirement (e.g., throughput, latency, jitter, etc.). The logical channel configuration parameters may comprise a plurality of parameters such as priority and/or prioritized bit rate (PBR) and/or bucket size duration (BSD), etc. In an example, one or more of the parameters configured for one or more logical channels may be employed by a logical channel prioritization procedure to multiplex data from a plurality of logical channels in a transport block (TB). The configuration parameters for a logical channel may indicate if a logical channel may be mapped to a cell type (e.g., licensed, unlicensed, mm-Wave, ultra-high frequency, etc.). The configuration parameters for a logical channel may indicate if a logical channel may be mapped to a TTI type/duration and/or a numerology and/or a service type (e.g., URLLC, eMBB, eMTC, etc.). The configuration parameters for a logical channel may indicate the maximum TTI duration that a logical channel may be mapped to.

In an example, a base station may control mapping of a logical channel (e.g., by the wireless device) to one or more numerologies and/or transmission time intervals (TTIs), e.g. TTI durations and/or cells and/or service types and/or groups. In an example, the mapping may be semi-static (e.g., with RRC configuration), dynamic (e.g., using physical layer and/or MAC layer signalling), pre-configured at the wireless device, hard split/soft split, etc. In an example, a wireless device may support a plurality of TTIs and/or numerologies from a single cell. In an example, a plurality of TTIs and/or numerologies and/or cells may be handled by a plurality of MAC entities. In an example, the plurality of TTIs and/or numerologies and/or cells may be grouped (e.g., based on band, types of service/QoS, etc.) and a group of TTIs/numerologies/cells may be handled by a MAC entity. In an example, the plurality of TTIs and/or numerologies and/or cells may be handled by a single MAC entity.

In an example, network/gNB may configure a radio bearer to be mapped to one or more numerologies/TTI durations/cells/service types. In an example, a MAC entity may support one or more numerologies/TTI durations/cells. In an example, a logical channel may be mapped to one or more numerologies/TTI durations/cells/cell types/service types. In an example, one or more logical channels may be mapped to a numerology/TTI duration/cell/cell type/service type. In an example, a HARQ entity may support one or more numerologies/TTI durations/cells/cell types/service types.

In an example embodiment, a wireless device may be configured with periodic resource allocation (e.g., semi-persistent scheduling (SPS) and/or grant-free resource allocation). The term periodic resource allocation and SPS or grant-free may have the same meaning in this specification. In an example, a base station may configure a plurality of uplink SPS grants using a DCI/grant. In an example, the SPS grants may be configured periodically. In an example, a SPS period may be configured for the wireless device using RRC. In an example, frequency resources (e.g., resource blocks, etc.) and/or time resources and/or modulation and coding scheme (MCS) and/or redundancy version (RV), etc., for SPS may be provided to the UE using RRC configuration and/or using grant/DCI.

In an example, an information element such as SPS-Config may be used to configure the semi-persistent scheduling configuration. Example SPS-Config information element is shown below. New IE formats may be defined and additional fields may be added to support enhanced SPS mechanisms, e.g., including supporting a plurality of SPSs and/or a plurality of SPSs corresponding to a plurality of logical channels and/or logical channel groups and/or TTIs and/or numerologies and/or cell types and/or service types. In an example, the SPS configuration may comprise the TTI duration for a SPS and/or logical channels and/or logical channel groups and/or numerologies and/or cell types and/or service types for a configured SPS. In an example, plurality of SPS configurations may be configured for a plurality of logical channels and/or logical channel groups and/or TTIs and/or numerologies and/or cell types and/or service types. In an example, the plurality of SPS configurations may be identified with a plurality of SPS indexes. Enhanced SPS-config IE may be implemented according to example embodiment to configure enhanced SPS according to example embodiments. In example embodiments, periodicity (e.g., time interval between two subsequent periodic resource allocation/SPS/grant-free resource allocation transmission occasions) may be based on one or parameters in RRC and/or an activation DCI. In example embodiments, a HARQ ID corresponding to transport block transmitted on a transmission occasion of periodic resource allocation/SPS/grant-free resource allocation may be based on one or parameters in RRC and/or an activation DCI.

```
SPS-Config ::=   SEQUENCE {
    semiPersistSchedC-RNTI        C-RNTI    OPTIONAL,     -- Need OR
    sps-ConfigDL       SPS-ConfigDL     OPTIONAL,          -- Need ON
    sps-ConfigUL       SPS-ConfigUL     OPTIONAL           --
Need ON
}
SPS-ConfigDL ::=  CHOICE{
    release              NULL,
    setup                SEQUENCE {
       semiPersistSchedIntervalDL    ENUMERATED {
                          sf10, sf20, sf32, sf40, sf64, sf80,
                          sf128, sf160, sf320, sf640, spare6,
                          spare5, spare4, spare3, spare2,
                          spare1},
```

```
    numberOfConfSPS-Processes    INTEGER (1..8),
    n1PUCCH-AN-PersistentList    N1PUCCH-AN-PersistentList,
    ...,
    [[ twoAntennaPortActivated-r10    CHOICE {
        release              NULL,
        setup                SEQUENCE {
            n1PUCCH-AN-PersistentListP1-r10 N1PUCCH-AN-
PersistentList
        }
    }                                  OPTIONAL -- Need ON
    ]]
    }
}
SPS-ConfigUL ::=  CHOICE {
    release               NULL,
    setup                 SEQUENCE {
        semiPersistSchedIntervalUL    ENUMERATED {
                          sf10, sf20, sf32, sf40, sf64, sf80,
                       sf128, sf160, sf320, sf640, sf1-v14xy,
                    sf2-v14xy, sf3-v14xy, sf4-v14xy, sf5-v14xy,
                                   spare1},
        implicitReleaseAfter          ENUMERATED  {e2, e3, e4, e8},
        p0-Persistent                 SEQUENCE {
            p0-NominalPUSCH-Persistent    INTEGER (-126..24),
            p0-UE-PUSCH-Persistent        INTEGER (-8..7)
        }   OPTIONAL, -- Need OP
        twoIntervalsConfig            ENUMERATED {true}
    OPTIONAL,  -- Cond TDD
    ...,
    [[ p0-PersistentSubframeSet2-r12    CHOICE {
        release              NULL,
        setup                SEQUENCE {
p0-NominalPUSCH-PersistentSubframeSet2-r12   INTEGER (-126..24),
    p0-UE-PUSCH-PersistentSubframeSet2-r12       INTEGER (-8..7)
        }
    }                                  OPTIONAL    -- Need
ON
    ]] ,
    [[ numberOfConfUlSPS-Processes-r13     INTEGER (1..8)
    OPTIONAL    -- Need OR
    ]]
    }
}
N1PUCCH-AN-PersistentList ::= SEQUENCE (SIZE (1..4)) OF INTEGER
    (0..2047)
```

In an example, SPS configuration IE may be enhanced and multiple downlink or uplink SPS may be configured for a cell. In an example, multiple SPS RNTI may be configured when a plurality of SPS is configured. In an example, RRC may comprise an index identifying an SPS configuration for a cell. In an example, the DCI employing SPS RNTI and triggering an SPS may include the index of the SPS that is triggered (initialized) or released.

In an example, SPS configuration may include MCS employed for packet transmission of an SPS grant. In an example, implicitReleaseAfter may be the number of empty transmissions before implicit release. In an example, the value e2 may correspond to 2 transmissions, e3 may correspond to 3 transmissions and so on. If skipUplinkTxSPS is configured, the UE may ignore this field.

In an example, n1PUCCH-AN-PersistentList, n1PUCCH-AN-PersistentListP1 may be List of parameter: $n_{PUCCH}^{(1,p)}$ for antenna port P0 and for antenna port P1 respectively. In an example, field n1-PUCCH-AN-PersistentListP1 may be applicable if the twoAntennaPortActivated-PUCCH-Format1a1b in PUCCH-ConfigDedicated-v1020 is set to true. Otherwise the field may not configured.

In an example, numberOfConfSPS-Processes may be the number of configured HARQ processes for downlink Semi-Persistent Scheduling. In an example, numberOfConfUl-SPS-Processes may be the number of configured HARQ processes for uplink Semi-Persistent Scheduling. In an example, base station may configure this field for asynchronous UL HARQ. In an example, other configuration parameters may be used to indicate and/or determine HARQ process IDs for SPS transmissions in different SPS occasions.

In an example, p0-NominalPUSCH-Persistent may be parameter: $P_{O\_NOMINAL\_PUSCH}(0)$. In an example, its unit may be dBm with step 1. In an example, this field may be applicable for persistent scheduling. In an example, if choice setup is used and p0-Persistent is absent, the value of p0-NominalPUSCH for p0-NominalPUSCH-Persistent may be applied. In an example, if uplink power control subframe sets are configured by tpc-SubframeSet, this field may apply for uplink power control subframe set 1.

In an example, p0-NominalPUSCH-PersistentSubframeSet2 may be the Parameter: In an example, its unit may be dBm with step 1. In an example, this field may be applicable for persistent scheduling. In an example, if p0-PersistentSubframeSet2-r12 is not configured, the value of p0-NominalPUSCH-SubframeSet2-r12 for p0-NominalPUSCH-PersistentSubframeSet2 may be applied. In an example, base station may configure this field if uplink power control subframe sets are configured by tpc-SubframeSet, in which case this field may apply for uplink power control subframe set 2.

In an example, p0-UE-PUSCH-Persistent may be the parameter: $P_{O\_UE\_PUSCH}(0)$ In an example, its unit may be in dB. In an example, this field may be applicable for persistent scheduling. In an example, if choice setup is used and p0-Persistent is absent, the value of p0 -UE-PUSCH for p0-UE-PUSCH-Persistent may be applied. In an example, if uplink power control subframe sets are configured by tpc-SubframeSet, this field may apply for uplink power control subframe set 1.

In an example, p0-UE-PUSCH-PersistentSubframeSet2 may be the Parameter: $P_{O\_UE\_PUSCH}(0)$. In an example, its unit may be in dB. In an example, this field may be applicable for persistent scheduling. In an example, if p0-PersistentSubframeSet2-r12 is not configured, the value of p0-UE-PUSCH-SubframeSet2 for p0-UE-PUSCH-PersistentSubframeSet2 may be applied. In an example, base station may configure this field only if uplink power control subframe sets are configured by tpc-SubframeSet, in which case this field may apply for uplink power control subframe set 2.

In an example, semiPersistSched C-RNTI may be the Semi-persistent Scheduling C-RNTI. In an example, semiPersistSchedIntervalDL may be the Semi-persistent scheduling interval in downlink. In an example, its value may be in number of sub-frames. In an example, a value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. Example embodiments enhance the configuration of SPS periods (e.g. in combination with DCI and/or a default duration and/or other configured/pre-configured values).

In an example, semiPersistSchedIntervalUL may be the Semi-persistent scheduling interval in uplink. In an example, its value may be in number of sub-frames. The value sf10 may correspond to 10 sub-frames, sf20 may correspond to 20 sub-frames and so on. For TDD, when the configured Semi-persistent scheduling interval is greater than or equal to 10 sub-frames, the UE may round this parameter down to the nearest integer (of 10 sub-frames), e.g. sf10 may correspond to 10 sub-frames, sf32 may correspond to 30 sub-frames, sf128 corresponds to 120 sub-frames. Example embodiments enhance the configuration of SPS periods (e.g. in combination with DCI and/or a default duration and/or other configured/pre-configured values).

In an example, twoIntervalsConfig may be a trigger of two-intervals-Semi-Persistent Scheduling in uplink. In an example, if this field is present and the configured Semi-persistent scheduling interval greater than or equal to 10 sub-frames, two-intervals-SPS may be enabled for uplink. Otherwise, two-intervals-SPS may be disabled.

In an example, if skipUplinkTxSPS is configured, the UE may skip UL transmissions for a configured uplink grant if no data is available for transmission in the UE buffer. In an example, base station may configure skipUplinkTxSPS when semiPersistSchedIntervalUL is shorter than a threshold period. In an example, the threshold may be pre-configured and or configured for the wireless device.

In an example, a wireless device may be configured with uplink skipping for SPS. In an example, the SPS uplink skipping configuration may be using RRC. In an example, for a UE configured with SPS uplink skipping, the UE may not transmit a signal (e.g., no TB transmission and/or padding transmission) if the UE has no data that may be mapped to the SPS grant. In an example, a wireless device configured with uplink skipping may transmit an acknowledgement (e.g., SPS confirmation MAC CE) after receiving a DCI activating or releasing a SPS. In an example, a wireless device configured with SPS uplink skipping may transmit one or more signal and/or MAC CE (e.g., CSI and/or BSR and/or PHR, etc.) even if the wireless device has no data to transmit.

In an example implementation, direction of a TTI for downlink and/or uplink transmission may be flexible. In an example, a plurality of TTI durations may be used by a wireless device and/or base station. In an example, a base station may configure a SPS for a wireless device with periodicity less than 1 ms. For example, considering the URLLC latency requirement (e.g., user plane latency of 0.5 ms for UL and 0.5 ms for DL), SPS period smaller than 1 ms may be configured if SPS is used for URLLC. In an example, transmission direction and TTI duration of SPS may be kept unchanged between SPS occasions.

In an example embodiment, a grant/DCI may activate SPS for a wireless device. The grant/DCI may indicate a TTI duration for the SPS. In an example, the grant/DCI may indicate an index for a TTI. The TTI duration corresponding to the index may be preconfigured and/or configured by the RRC. In an example, a TTI duration for a SPS may be configured by RRC. In an example, RRC may configure the logical channel(s) and/or logical channel group(s) and/or service type(s) (e.g., URLLC, eMBB, eMTC, etc.) corresponding to a SPS. A TTI duration and/or numerology corresponding to the logical channel(s) and/or logical channel group(s) and/or service type(s) corresponding to a SPS may be known from a TTI duration and/or numerology that the logical channel(s) and/or logical channel group(s) and/or the service type(s) may be mapped to. In an example, the mapping between the logical channel(s) and/or logical channel group(s) and/or service type(s) to TTI (e.g., TTI duration)/numerology may be configured for the wireless device (e.g., using RRC) and/or pre-configured and/or dynamically indicated to the wireless device. In an example, RRC may configure an absolute SPS period (e.g., in terms of number of TTIs).

In an example embodiment, the SPS period, in terms of time, may be obtained by multiplying the absolute SPS period by a TTI duration indicated in the grant/DCI or configured by RRC and/or a duration based on the TTI duration indicated in the grant/DCI or configured by RRC. In example, the wireless device may employ a first state variable (e.g., CURRENT_TTIj) corresponding to a first TTI duration (e.g., TTIj). The first TTI duration may be the TTI duration corresponding to the first TTI occasion and/or the subsequent SPS occasions. The wireless device may increment the first state variable after a TTIj duration. The wireless device may reset the first state variable after a first number (e.g., Kj) is reached. In an example, the first number may be pre-configured. In an example, RRC may configure a SPS period (e.g., an absolute period e.g., in terms of TTIs). In an example, the RRC configured SPS period may be called semiPersistSchedInterval. In an example, the Nth SPS grant occasion may be at a TTI where CURRENT_TTIj satisfies the following equation:

$$\text{CURRENT\_TTI}j = (\text{CURRENT\_TTI}j, \text{start} + N^* \text{semiPersistSchedInterval}) \bmod Kj$$

where CURRENT_TTIj, start is the CURRENT_TTIj associated with a first occurring SPS occasion.

In an example, at least one RRC message comprises first periodic resource allocation configuration parameters comprising a first periodicity parameter (e.g. called absolute SPS period) of a first periodic resource allocation. The SPS period, in terms of time, may be obtained by multiplying the first periodicity parameter by a first duration (e.g., a default TTI duration and/or a first number of symbol duration(s), etc.). A base station may transmit a DCI (e.g. activation DCI) indicating activation of the first periodic resource allocation, wherein the downlink control information comprises one or more first fields. In an example, the first periodicity parameter indicates a number symbols; the one or more first fields indicate a symbol duration. The time interval between two subsequent transmission occasions may be based on the number of symbols multiplied with the symbol duration. In an example, the first duration may be one or more subframes, one or more slot durations, one or more mini-slot durations, and/or one or more symbols, etc. In an example, the first duration may be a fraction of a subframe (e.g., 0.2, 0.5, etc.). In an example, the first duration may be pre-configured. In an example, the first duration may be configured for the wireless device (e.g., using RRC). In an example, the first duration may be dynamically indicated (e.g., in DCI e.g. the SPS activating DCI) to the wireless device. In an example, the wireless device may define a state variable (e.g., CURRENT_TTI). The wireless device may increment the state variable after a first duration (e.g., default TTI). The wireless device may reset the state variable after a number is reached (e.g., K). In an example, RRC may configure a SPS period (e.g., an absolute period e.g., in terms of TTIs). In an example, the RRC configured SPS period may be called semiPersistSchedInterval. In an example, the Nth SPS grant occasion may be at a TTI where CURRENT_TTI satisfies the following equation:

$$CURRENT\_TTI=(CURRENT\_TTIstart+N*semiPersistSchedInterval) \bmod K$$

where CURRENT_TTIstart is the CURRENT_TTI associated with a first occurring SPS occasion.

Implementation of existing periodic resource allocation mechanisms (e.g. semi-persistent scheduling, configured grant type 1 or 2, etc) when multiple numerologies (e.g. multiple symbol durations, TTI durations, etc) are implemented results in inefficient resource allocation. There is a need to provide additional flexibility and efficiency in periodic resource allocation when various numerologies are implemented in a wireless network. Example embodiments provide enhanced periodic resource allocation mechanisms (e.g. for configured grants in New Radio) when various numerologies supporting different symbol durations are implemented. Example embodiments enable flexible configuration of periodicity for a configured grant based on multiple parameters. In an example, the multiple parameters may be configured by RRC. In an example, the multiple parameters may be semi-statically configured by RRC or dynamically indicated by DCI. Example embodiments improves uplink resource efficiency and enables supporting services with various QoS requirements such as eMBB, and URLLC.

In an example, a first RRC configured periodicity parameter may be based on TTI/symbol duration, and the DCI that activates the SPS/grant-free resource allocation may determine the TTI/symbol duration, and this provides the flexibility needed to support various services in a new radio supporting URLLC, etc. In an example, a first RRC configured periodicity parameter may be based on TTI/symbol duration, and a second RRC configured parameter may indicate the TTI/symbol duration.

Figure 15:
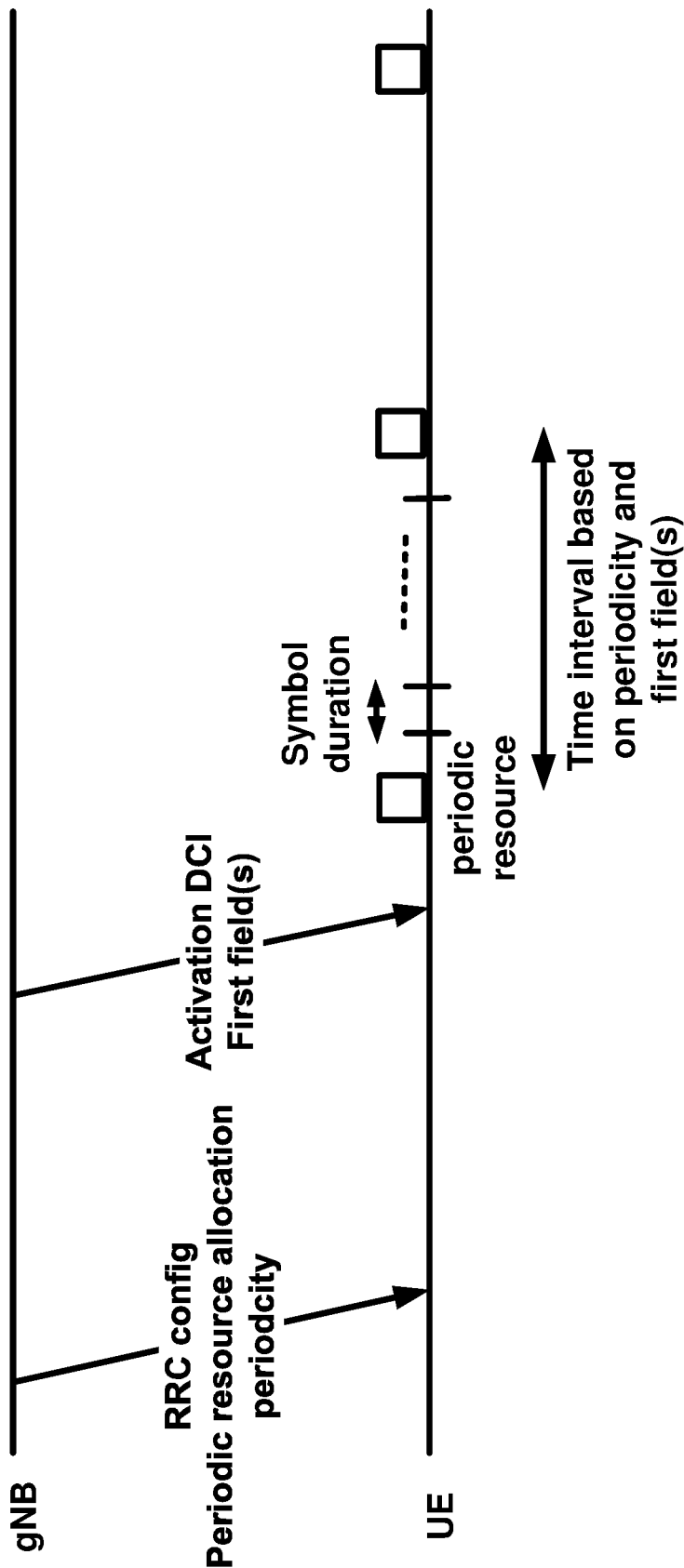
FIG. 15 is a periodic resource allocation procedure as per an aspect of an embodiment of the present disclosure.

An example embodiment is shown in FIG. 15. In an example, a wireless device may receive from a base station one or more radio resource control (RRC) messages. The one or more RRC messages may comprise first periodic resource allocation configuration parameters. The first periodic resource allocation configuration parameters may correspond to a first periodic resource allocation. In an example, the first periodic resource allocation may correspond to a first grant-free resource allocation. In an example, the first grant-free resource allocation may be a type-1 grant-free resource allocation. With the type-1 grant-free resource allocation, a plurality of resources may be activated in response to receiving the first periodic resource allocation configuration parameters (e.g., configuration parameters of the first type-1 grant-free resource allocation). In an example, the first grant-free resource allocation may be a type-2 grant-free resource allocation. With the type-2 grant-free resource allocation, a plurality of resources may be activated in response to receiving the first periodic resource allocation configuration parameters (e.g., configuration parameters of the first type-2 grant-free resource allocation) and receiving an activation DCI activating the first type-2 grant-free resource allocation. In an example, the first periodic resource allocation may correspond to a semi-persistent scheduling resource allocation. In an example, the first periodic resource allocation configuration parameters may comprise a periodicity parameter of the first periodic resource allocation. In an example, a periodicity of the first periodic resource allocation (e.g., time interval between two subsequent transmission occasions) may be at least based on the first periodicity parameter configured by the RRC. In an example, the first periodic resource allocation configuration parameters may comprise one or more other parameters. The one or more other parameters may comprise a radio network temporary identifier.

In an example, the wireless device may receive a DCI indicating activation of the first periodic resource allocation. In an example, the first periodic resource allocation may be a type-2 grant-free resource allocation. The wireless device may activate a plurality of resources in response to receiving the DCI. In an example, the DCI may be associated with the radio network temporary identifier (e.g., configured with RRC for the first periodic resource allocation). The DCI may comprise a plurality of fields comprising one or more resource allocation parameters, one or more power control parameters, one or more HARQ-related parameters, etc. In an example, the DCI may comprise one or more first fields. In an example, the DCI may indicate radio resources for transmission of a plurality of transport blocks. In an example, the DCI may comprise one or more second fields indicating the radio resources for transmission of the plurality of transport blocks. In an example, the DCI may indicate one or more transmission durations up to a first value. In an example, a transmission duration in the one or more transmission durations may correspond to a transport block/packet duration. In an example, a transmission duration in the one or more transmission durations may correspond to a transmission time interval (TTI). In an example, a transmission duration in the one or more transmission durations may correspond to a PUSCH transmission duration. The first value may be a maximum transmission duration value. In an example, a transmission duration in the one or more transmission durations may correspond to one or more logical channels. In an example the wireless device may validate the DCI as a periodic resource allocation activation DCI before activating the plurality of resources corresponding to the periodic resource allocation. In an example, at least a new data indicator (NDI) filed of the DCI may be zero to validate the DCI as the periodic resource allocation activation DCI. In an example, the one or more first fields in the DCI may indicate a numerology. In an example, the numerology may indicate one or more parameters comprising subcarrier spacing, symbol duration, cyclic prefix duration, etc. In an example, the one or more fields may indicate a transmission time interval (TTI). In an example the TTI may indicate a transport block/packet transmission duration.

In an example, the wireless device may transmit a plurality of transport blocks via radio resources associated with the first periodic resource allocation. In an example, a time interval between two subsequent transmission occasions may be based on the one or more first fields and the first periodicity parameter (e.g., as configured by the RRC). In an example, a symbol duration for determining the interval between two subsequent transmission occasions may be based on the one or more first fields. The wireless device may obtain the time interval between two subsequent transmission occasions by multiplying the symbol duration and the periodicity parameter indicated by the RRC.

In an example embodiment, a wireless device may receive from a base station one or more radio resource control (RRC) messages. The one or more RRC messages may comprise first periodic resource allocation configuration parameters. The first periodic resource allocation configuration parameters may correspond to a first periodic resource allocation. In an example, the first periodic resource allocation may correspond to a first grant-free resource allocation. In an example, the first grant-free resource allocation may be a type-1 grant-free resource allocation. With the type-1 grant-free resource allocation, a plurality of resources may be activated in response to receiving the first periodic resource allocation configuration parameters (e.g., configuration parameters of the first type-1 grant-free resource allocation). In an example, the first grant-free resource allocation may be a type-2 grant-free resource allocation. With the type-2 grant-free resource allocation, a plurality of resources may be activated in response to receiving the first periodic resource allocation configuration parameters (e.g., configuration parameters of the first type-2 grant-free resource allocation) and receiving an activation DCI activating the first type-2 grant-free resource allocation. In an example, the first periodic resource allocation may correspond to a semi-persistent scheduling resource allocation. In an example, the first periodic resource allocation configuration parameters may comprise a periodicity parameter of the first periodic resource allocation. In an example, the first periodic resource allocation configuration parameters may comprise a second parameter. The second parameter may indicate a numerology parameter. In an example, the numerology parameter may determine a plurality of parameters comprising a symbol duration, a subcarrier spacing, etc. In an example, a periodicity of the first periodic resource allocation (e.g., time interval between two subsequent transmission occasions) may be at least based on the first periodicity parameter and the second parameter configured by the RRC. In an example, the first periodic resource allocation configuration parameters may comprise one or more other parameters. The one or more other parameters may comprise a radio network temporary identifier.

In an example, the wireless device may transmit a plurality of transport blocks via radio resources associated with the first periodic resource allocation. In an example, a time interval between two subsequent transmission occasions may be based on the first periodicity parameter and the second parameter (e.g., as configured by the RRC). In an example, a symbol duration for determining the interval between two subsequent transmission occasions may be based on the second parameter. The wireless device may obtain/determine the time interval between two subsequent transmission occasions by multiplying the symbol duration and the periodicity parameter indicated by the RRC. In an example, the first periodicity parameter indicates a number of symbols. The second parameter indicate a symbol duration. The time interval between two subsequent transmission occasions is based on the number of symbols multiplied with the symbol duration. In an example, the first periodicity parameter indicates a number of transmission time intervals. The second parameter indicates a transmission time interval duration. The time interval between two subsequent transmission occasions is based on the number of transmission time intervals multiplied with the transmission time interval duration.

In an example embodiment, the base station may configure a SPS for a wireless device with an offset value (e.g., 0, 1, . . . ). In an example, the offset may be configured using RRC. In an example, the offset may be dynamically indicated (e.g., using DCI and/or MAC CE, etc.). In an example, the wireless device may determine the SPS occasions using a SPS period (e.g., configured by RRC) and/or the offset value and/or a first duration (e.g., a default TTI and/or a first number of symbols and/or a first number of subframes and/or a first number of slots and/or a first number of mini-slots, etc.).

In an example, in order to transmit on an UL-SCH the MAC entity may need to have a valid uplink grant (e.g., except for non-adaptive HARQ retransmissions). In an example, the MAC entity may receive the uplink grant dynamically (e.g., on the PDCCH) or in a Random Access Response or which may be configured semi-persistently. In an example, to perform requested transmissions, the MAC layer may receive HARQ information from lower layers. When the physical layer is configured for uplink spatial multiplexing, the MAC layer may receive one or more grants (e.g., up to two grants e.g., one per HARQ process) for a same TTI from lower layers.

In an example, MAC entity may be configured with a C-RNTI, a Semi-Persistent Scheduling C-RNTI, or a Temporary C-RNTI. In an example, for each TTI and for each Serving Cell belonging to a TAG that has a running timeAlignmentTimer and for each grant received for this TTI: if an uplink grant for this TTI and this Serving Cell has been received on the PDCCH for the MAC entity's C-RNTI or Temporary C-RNTI or if an uplink grant for this TTI has been received in a Random Access Response: if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant: the MAC entity may consider the NDI to have been toggled for the corresponding HARQ process regardless of the value of the NDI. The MAC entity may deliver the uplink grant and the associated HARQ information to the HARQ entity for this TTI. Otherwise, if this Serving Cell is the SpCell and if an uplink grant for this TTI has been received for the SpCell on the PDCCH of the SpCell for the MAC entity's Semi-Persistent Scheduling C-RNTI and if the NDI in the received HARQ information is 1, the MAC entity may consider the NDI for the corresponding HARQ process not to have been toggled. The MAC entity may deliver the uplink grant and the associated HARQ information to the HARQ entity for this TTI. Otherwise if the NDI in the received HARQ information is 0: if PDCCH contents indicate SPS release: if the MAC entity is configured with skipUplinkTxSPS: the MAC entity may trigger an SPS confirmation. if an uplink grant for this TTI has been configured: the MAC entity may consider the NDI bit for the corresponding HARQ process to have been toggled. The MAC entity may deliver the configured uplink grant and the associated HARQ information to the HARQ entity for this TTI. Otherwise, the MAC entity may clear the configured uplink grant (if any). Otherwise if the MAC entity is configured with skipUplinkTxSPS: the MAC entity may trigger an SPS confirmation. The MAC entity may store the uplink grant and the associated HARQ information as configured uplink grant. The MAC entity may initialise (if not active) or re-initialise (if already active) the configured uplink grant to start in this TTI and to recur according to SPS rules. If UL HARQ operation is asynchronous, the MAC entity may set the HARQ Process ID to the HARQ Process ID associated with this TTI. The MAC entity may consider the NDI bit for the corresponding HARQ process to have been toggled. The MAC entity may deliver the configured uplink grant and the associated HARQ information to the HARQ entity for this TTI. Otherwise, if this Serving Cell is the SpCell and an uplink grant for this TTI has been configured for the SpCell: if UL HARQ operation is asynchronous, the MAC entity may set the HARQ Process ID to the HARQ Process ID associated with this TTI. The MAC entity may consider the NDI bit for the corresponding HARQ process to have been toggled. The MAC entity may deliver the configured uplink grant, and the associated HARQ information to the HARQ entity for this TTI.

In an example, the period of configured uplink grants MAY BE expressed in TTIs.

In an example, if the MAC entity receives both a grant in a Random Access Response and a grant for its C-RNTI or Semi persistent scheduling C-RNTI requiring transmissions on the SpCell in the same UL subframe, the MAC entity may choose to continue with either the grant for its RA-RNTI or the grant for its C-RNTI or Semi persistent scheduling C-RNTI.

In an example, when a configured uplink grant is indicated during a measurement gap and indicates an UL-SCH transmission during a measurement gap, the MAC entity may process the grant but may not transmit on UL-SCH. In an example, when a configured uplink grant is indicated during a Sidelink Discovery gap for reception and indicates an UL-SCH transmission during a Sidelink Discovery gap for transmission with a SL-DCH transmission, the MAC entity may process the grant but may not transmit on UL-SCH.

In an example, a gNB may transmit dynamic uplink grants to a wireless device for retransmissions of packets/TBs transmitted using SPS grants. In an example, when the gNB fails to decode an UL transmission, it may send an UL grant to wireless device for retransmission. In an example, reception of an UL grant may be interpreted as a NACK and not receiving an uplink grant may indicate an ACK to the wireless device. In an example, a UE may assume ACK unless an UL grant for retransmission is received. In an example, the base station may configure a maximum feedback timer for a wireless device wherein the wireless devices may start a timer after transmission of TB using a SPS grant. If the wireless device does not receive an uplink grant while the timer is running, the wireless device may assume that the base station has received the TB correctly. The wireless device may reuse the corresponding HARQ process.

In an example embodiment, a DCI activating a SPS for a wireless device indicates the HARQ process ID for a first SPS occasion. In an example, the wireless device may use a rule to determine the HARQ process ID for subsequent SPS occasions. In an example, the HARQ IDs for subsequent SPS occasions may increase sequentially within a pool of HARQ process IDs. In an example, the pool of HARQ process IDs may be from 0 to numberOfConfUlSPS-Processes-1 where numberOfConfUlSPS-Processes is configured for the wireless device. In an example, the pool of HARQ process IDs may be from process #1 to process #2 where process #1 and/or process #2 may be configured for the wireless device. In an example, numberOfConfUlSPS-Processes and/or process #1 and/or process #2 may be indicated using the DCI activating the SPS. In an example, numberOfConfUlSPS-Processes and/or process #1 and/or process #2 may be configured using RRC. In an example, the HARQ process ID may not increase for a SPS occasion if uplink skipping is configured and if wireless device does not transmit at the SPS occasion due to lack of data (e.g., lack of data mappable to the SPS grant).

In an example embodiment, the HARQ process ID for a first SPS occasion may be pre-configured to a first value (e.g., 0, 1, 2, etc.). In an example, the wireless device may use a rule to determine the HARQ process ID for subsequent SPS occasions. In an example, the HARQ IDs for subsequent SPS occasions may increase sequentially within a pool of HARQ process IDs. In an example, the pool of HARQ process IDs may be from 0 to numberOfConfUlSPS-Processes-1 where numberOfConfUlSPS-Processes is configured for the wireless device. In an example, the pool of HARQ process IDs may be from process #1 to process #2 where process #1 and/or process #2 may be configured for the wireless device. In an example, numberOfConfUlSPS-Processes and/or process #1 and/or process #2 may be indicated using the DCI activating the SPS. In an example, numberOfConfUlSPS-Processes and/or process #1 and/or process #2 may be configured using RRC. In an example, the HARQ process ID may not increase for a SPS occasion if uplink skipping is configured and if wireless device does not transmit at the SPS occasion due to lack of data (e.g., lack of data mappable to the SPS grant).

In an example embodiment, the HARQ process ID for a first SPS occasion may be configured using RRC. In an example, the wireless device may use a rule to determine the HARQ process ID for subsequent SPS occasions. In an example, the HARQ IDs for subsequent SPS occasions may increase sequentially within a pool of HARQ process IDs. In an example, the pool of HARQ process IDs may be from 0 to numberOfConfUlSPS-Processes-1 where numberOfConfUlSPS-Processes is configured for the wireless device. In an example, the pool of HARQ process IDs may be from process #1 to process #2 where process #1 and/or process #2 may be configured for the wireless device. In an example, numberOfConfUlSPS-Processes and/or process #1 and/or process #2 may be indicated using the DCI activating the SPS. In an example, numberOfConfUlSPS-Processes and/or process #1 and/or process #2 may be configured using RRC. In an example, the HARQ process ID may not increase for a SPS occasion if uplink skipping is configured and if wireless device does not transmit at the SPS occasion due to lack of data (e.g., lack of data mappable to the SPS grant).

In example, the wireless device may define a first state variable (e.g., CURRENT_TTIj) corresponding to a first TTI duration (e.g., TTIj). The first TTI duration may be the TTI duration corresponding to the first TTI occasion and/or the subsequent SPS occasions. In an example, the first TTI duration (and/or TTI durations for subsequent SPS occasions) may be indicated in a DCI activating the SPS. In an example, the first TTI duration may be configured and/or indicated using RRC. The wireless device may increment the first state variable after a TTIj duration. The wireless device may reset the first state variable after a first number (e.g., Kj) is reached. In an example, the first number may be pre-configured. In an example, RRC may configure a SPS period (e.g., an absolute period e.g., in terms of TTIs). In an example, the RRC configured SPS period may be called semiPersistSchedInterval. In an example, the base station may configure the wireless device with a parameter numberOfConfUlSPS. In an example, the base station may configure the wireless device with parameters process1 and process2.

In an example, the HARQ process ID associated with this TTI (corresponding to CURRENT_TTIj) may be derived using the following equation for asynchronous uplink HARQ operation:

HARQ Process ID=[floor(CURRENT_TTIj/semiPersistSchedIntervalUL)] modulo numberOfConfUlSPS-Processes, where:
CURRENT_TTIj=SFN*10*(number of TTIjs in a subframe)+SF number*(number of TTIjs in a subframe)+TTIj number in the subframe. The floor of a number (e.g., X) may be the largest number smaller than X. For example, floor (4.3)=4, floor(5.1)=5, etc.

In an example, the HARQ process ID associated with this TTI (corresponding to CURRENT_TTIj) may be derived using the following equation for asynchronous uplink HARQ operation:

HARQ Process ID=process1+[floor(CURRENT_TTIj/semiPersistSchedIntervalUL)] modulo (process2−process1), where:
CURRENT_TTIj=SFN*10*(number of TTIjs in a subframe)+SF number*(number of TTIjs in a subframe)+TTIj number in the subframe.

Implementation of existing periodic resource allocation mechanisms (e.g. semi-persistent scheduling, configured grant type 1 or 2, etc) when multiple numerologies (e.g. multiple symbol durations, TTI durations, etc) are implemented results in inefficient resource allocation. There is a need to provide additional flexibility and efficiency in periodic resource allocation when various numerologies are implemented in a wireless network. Example embodiments provide enhanced periodic resource allocation mechanisms (e.g. for configured grants in New Radio) when various numerologies supporting different symbol durations are implemented. Example embodiments enhance the process for HARQ identifier determination of a transport block associated with a periodic resource allocation. based on multiple parameters. In an example, the multiple parameters may be configured by RRC. In an example, the multiple parameters may be semi-statically configured by RRC or dynamically indicated by DCI. Example embodiments improves uplink resource efficiency and enables supporting services with various QoS requirements such as eMBB, and URLLC.

In an example, a first RRC configured periodicity parameter may be based on TTI/symbol duration, and the DCI that activates the SPS/grant-free resource allocation may determine the TTI/symbol duration, and this provides the flexibility needed to support various services in a new radio supporting URLLC, etc. In an example, a first RRC configured periodicity parameter may be based on TTI/symbol duration, and a second RRC configured parameter may indicate the TTI/symbol duration.

Figure 16:
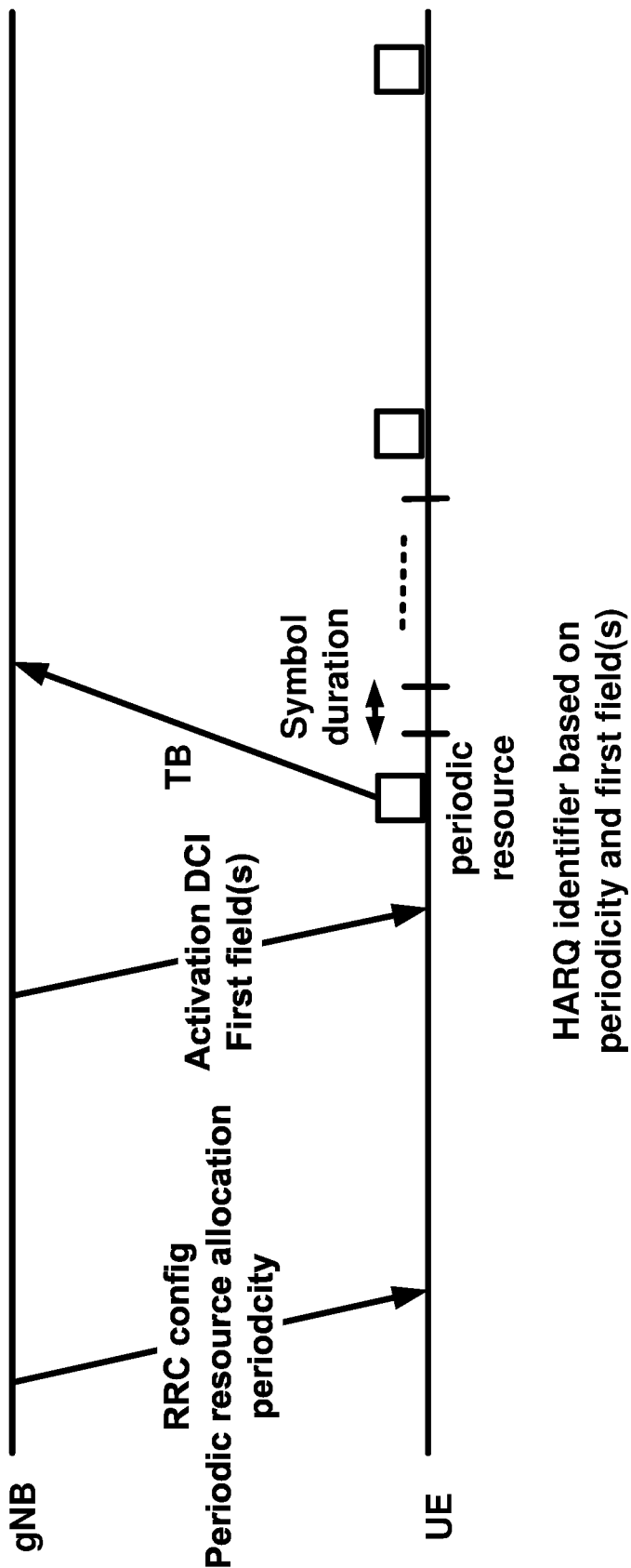
FIG. 16 is a periodic resource allocation procedure as per an aspect of an embodiment of the present disclosure.

An example embodiment is shown in FIG. 16. In an example, a wireless device may receive from a base station one or more radio resource control (RRC) messages. The one or more RRC messages may comprise first periodic resource allocation configuration parameters. The first periodic resource allocation configuration parameters may correspond to a first periodic resource allocation. In an example, the first periodic resource allocation may correspond to a first grant-free resource allocation. In an example, the first grant-free resource allocation may be a type-1 grant-free resource allocation. With the type-1 grant-free resource allocation, a plurality of resources are activated in response to receiving the first periodic resource allocation configuration parameters (e.g., configuration parameters of the first type-1 grant-free resource allocation). In an example, the first grant-free resource allocation may be a type-2 grant-free resource allocation. With the type-2 grant-free resource allocation, a plurality of resources are activated in response to receiving the first periodic resource allocation configuration parameters (e.g., configuration parameters of the first type-2 grant-free resource allocation) and receiving an activation DCI activating the first type-2 grant-free resource allocation. In an example, the first periodic resource allocation may correspond to a semi-persistent scheduling resource allocation. In an example, the first periodic resource allocation configuration parameters may comprise a periodicity parameter of the first periodic resource allocation. In an example, a periodicity of the first periodic resource allocation (e.g., time interval between two subsequent transmission occasions) may be at least based on the first periodicity parameter configured by the RRC. In an example, the first periodic resource allocation configuration parameters may comprise one or more other parameters. The one or more other parameters may comprise a radio network temporary identifier.

In an example, the wireless device may receive a DCI indicating activation of the first periodic resource allocation. In an example, the first periodic resource allocation may be a type-2 grant-free resource allocation. The wireless device may activate a plurality of resources in response to receiving the DCI. In an example, the DCI may be associated with the radio network temporary identifier (e.g., configured with RRC for the first periodic resource allocation). The DCI may comprise a plurality of fields comprising one or more resource allocation parameters, one or more power control parameters, one or more HARQ-related parameters, etc. In an example, the DCI may comprise one or more first fields. In an example, the DCI may indicate radio resources for transmission of a plurality of transport blocks. In an example, the DCI may comprise one or more second fields indicating the radio resources for transmission of the plurality of transport blocks. In an example, the DCI may indicate one or more transmission durations up to a first value. In an example, a transmission duration in the one or more transmission durations may correspond to a transport block/packet duration. In an example, a transmission duration in the one or more transmission durations may correspond to a transmission time interval (TTI). In an example, a transmission duration in the one or more transmission durations may correspond to a PUSCH transmission duration. The first value may be a maximum transmission duration value. In an example, a transmission duration in the one or more transmission durations may correspond to one or more logical channels. In an example the wireless device may validate the DCI as a periodic resource allocation activation DCI before activating the plurality of resources corresponding to the periodic resource allocation. In an example, at least a new data indicator (NDI) filed of the DCI may be zero to validate the DCI as the periodic resource allocation activation DCI. In an example, the one or more first fields in the DCI may indicate a numerology. In an example, the numerology may indicate one or more parameters comprising subcarrier spacing, symbol duration, cyclic prefix duration, etc. In an example, the one or more fields may indicate a transmission time interval (TTI). In an example the TTI may indicate a transport block/packet transmission duration.

In an example, the wireless device may transmit a plurality of transport blocks via radio resources associated with the first periodic resource allocation. In an example, the wireless device may transmit a transport block associated with a hybrid automatic repeat request (HARQ) process identifier via radio resources associated with the first periodic resource allocation. The HARQ identifier may be based on the one or more first field and the first periodicity parameter (e.g., as configured by the RRC).

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 17:
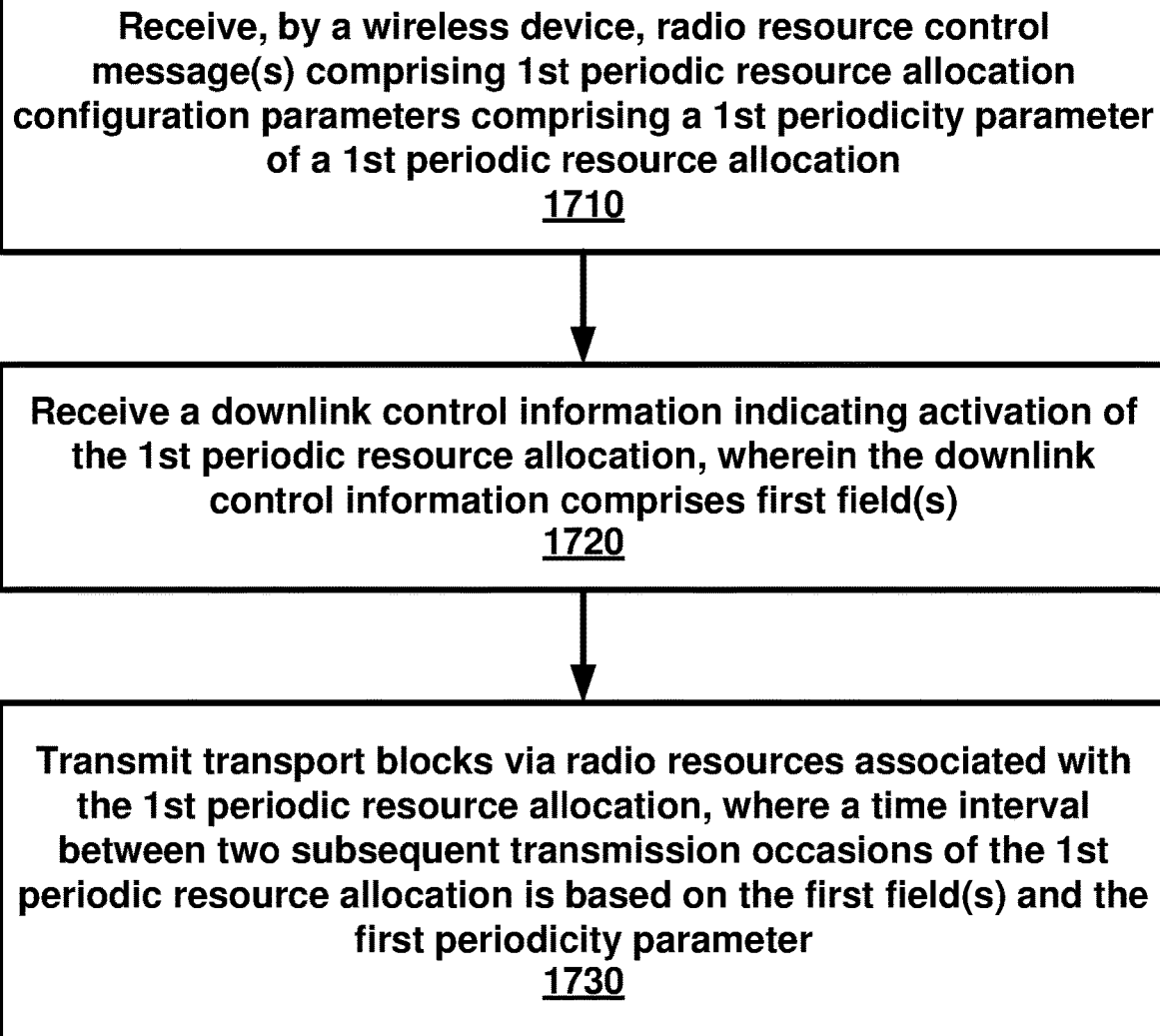
FIG. 17 is a flow diagram of an aspect of an embodiment of the present disclosure.

FIG. 17 is an example flow diagram as per an aspect of an embodiment of the present disclosure. At 1710, a wireless device receives one or more radio resource control messages. The one or more radio resource control messages may comprise first periodic resource allocation configuration parameters comprising a first periodicity parameter of a first periodic resource allocation. At 1720, a downlink control information indicating activation of the first periodic resource allocation may be received. The downlink control information may comprise one or more first fields. At 1730, a plurality of transport blocks may be transmitted via radio resources associated with the first periodic resource allocation. A time interval between two subsequent transmission occasions of the first periodic resource allocation may be based on the one or more first fields and the first periodicity parameter.

According to an embodiment, the one or more first fields may indicate a numerology, wherein the numerology indicates a symbol duration. According to an embodiment, the first periodicity parameter indicates a number of symbols; the one or more first fields may indicate a symbol duration and the time interval between two subsequent transmission occasions is based on the number of symbols multiplied with the symbol duration. According to an embodiment, the first periodic resource allocation configuration parameters may comprise a radio network temporary identifier. According to an embodiment, the downlink control information may be associated with the radio network temporary identifier. According to an embodiment, the downlink control information may indicate radio resources for transmission of the plurality of transport blocks. According to an embodiment, the downlink control information comprises one or more second fields, the radio resources being determined based on one or more second fields. According to an embodiment, the downlink control information may indicate one or more transmission durations up to a first value for transmission of the plurality of transport blocks. According to an embodiment, a transmission duration in the one or more transmission duration may correspond to one or more logical channels. According to an embodiment, the first periodicity parameter may indicate a number of transmission time intervals; the one or more first fields may indicate a transmission time interval duration; and the time interval between two subsequent transmission occasions may be based on the number of transmission time intervals multiplied with the transmission time interval duration.

Figure 18:
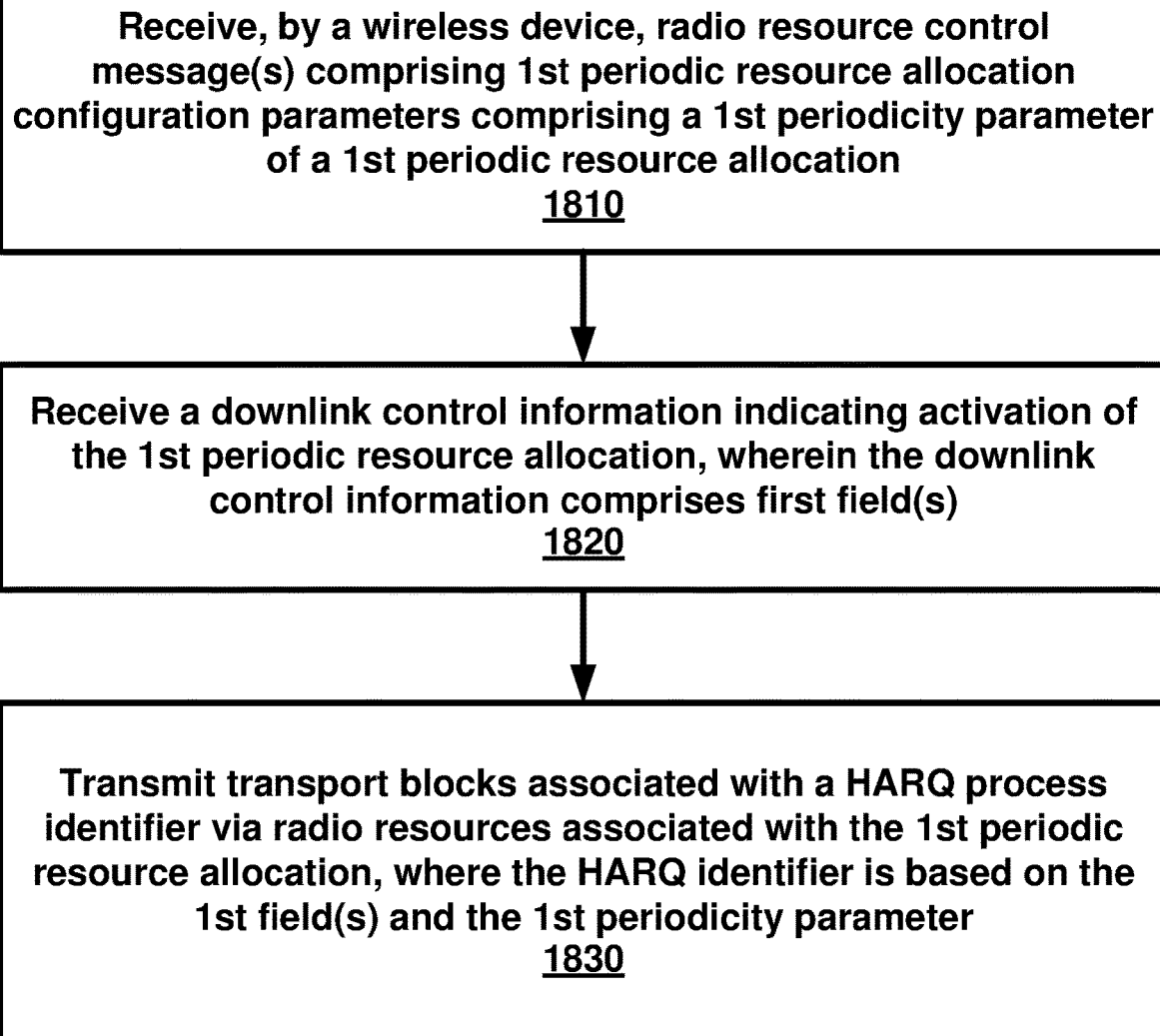
FIG. 18 is a flow diagram of an aspect of an embodiment of the present disclosure.

FIG. 18 is an example flow diagram as per an aspect of an embodiment of the present disclosure. At 1810, a wireless device receives one or more radio resource control messages. The one or more radio resource control messages may comprise first periodic resource allocation configuration parameters comprising a first periodicity parameter of a first periodic resource allocation. At 1820, downlink control information indicating activation of the first periodic resource allocation may be received. The downlink control information may comprise one or more first fields. At 1830, a transport block associated with a hybrid automatic repeat request (HARQ) process identifier may be transmitted via radio resources associated with the first periodic resource allocation. The HARQ identifier may be based on the one or more first field and the first periodicity parameter.

According to an embodiment, the one or more first fields may indicate a numerology, wherein the numerology may indicate a symbol duration. According to an embodiment, the first periodicity parameter indicates a number of symbols; the one or more first fields may indicate a symbol duration; and the time interval between two subsequent transmission occasions is based on the number of symbols multiplied with the symbol duration. According to an embodiment, the first periodic resource allocation configuration parameters may comprise a radio network temporary identifier. According to an embodiment, the downlink control information may be associated with the radio network temporary identifier. According to an embodiment, the downlink control information may indicate radio resources for transmission of the plurality of the transport block. According to an embodiment, the downlink control information comprises one or more second fields, the radio resources being determined based on one or more second fields. According to an embodiment, the downlink control information indicates one or more transmission durations up to a first value for transmission of the plurality of transport blocks. According to an embodiment, a transmission duration in the one or more transmission duration may correspond to one or more logical channels. According to an embodiment, the first periodicity parameter may indicate a number of transmission time intervals; the one or more first fields may indicate a transmission time interval duration; and the time interval between two subsequent transmission occasions may be based on the number of transmission time intervals multiplied with the transmission time interval duration.

FIG. 19 is an example flow diagram as per an aspect of an embodiment of the present disclosure. At 1910, a base station may transmit one or more radio resource control messages. The one or more radio resource control messages may comprise first periodic resource allocation configuration parameters comprising a first periodicity parameter of a first periodic resource allocation. At 1920, a downlink control information indicating activation of the first periodic resource allocation may be transmitted. The downlink control information may comprise one or more first fields. At 1930, a plurality of transport blocks may be received via radio resources associated with the first periodic resource allocation. A time interval between two subsequent transmission occasions of the first periodic resource allocation may be based on the one or more first fields and the first periodicity parameter.

According to an embodiment, the one or more first fields may indicate a numerology, wherein the numerology indicates a symbol duration. According to an embodiment, the first periodicity parameter indicates a number of symbols; the one or more first fields may indicate a symbol duration and the time interval between two subsequent transmission occasions is based on the number of symbols multiplied with the symbol duration. According to an embodiment, the first periodic resource allocation configuration parameters may comprise a radio network temporary identifier. According to an embodiment, the downlink control information may be associated with the radio network temporary identifier. According to an embodiment, the downlink control information may indicate radio resources for transmission of the plurality of transport blocks. According to an embodiment, the downlink control information comprises one or more second fields, the radio resources being determined based on one or more second fields. According to an embodiment, the downlink control information may indicate one or more transmission durations up to a first value for transmission of the plurality of transport blocks. According to an embodiment, a transmission duration in the one or more transmission duration may correspond to one or more logical channels. According to an embodiment, the first periodicity parameter may indicate a number of transmission time intervals; the one or more first fields may indicate a transmission time interval duration; and the time interval between two subsequent transmission occasions may be based on the number of transmission time intervals multiplied with the transmission time interval duration.

Figure 20:
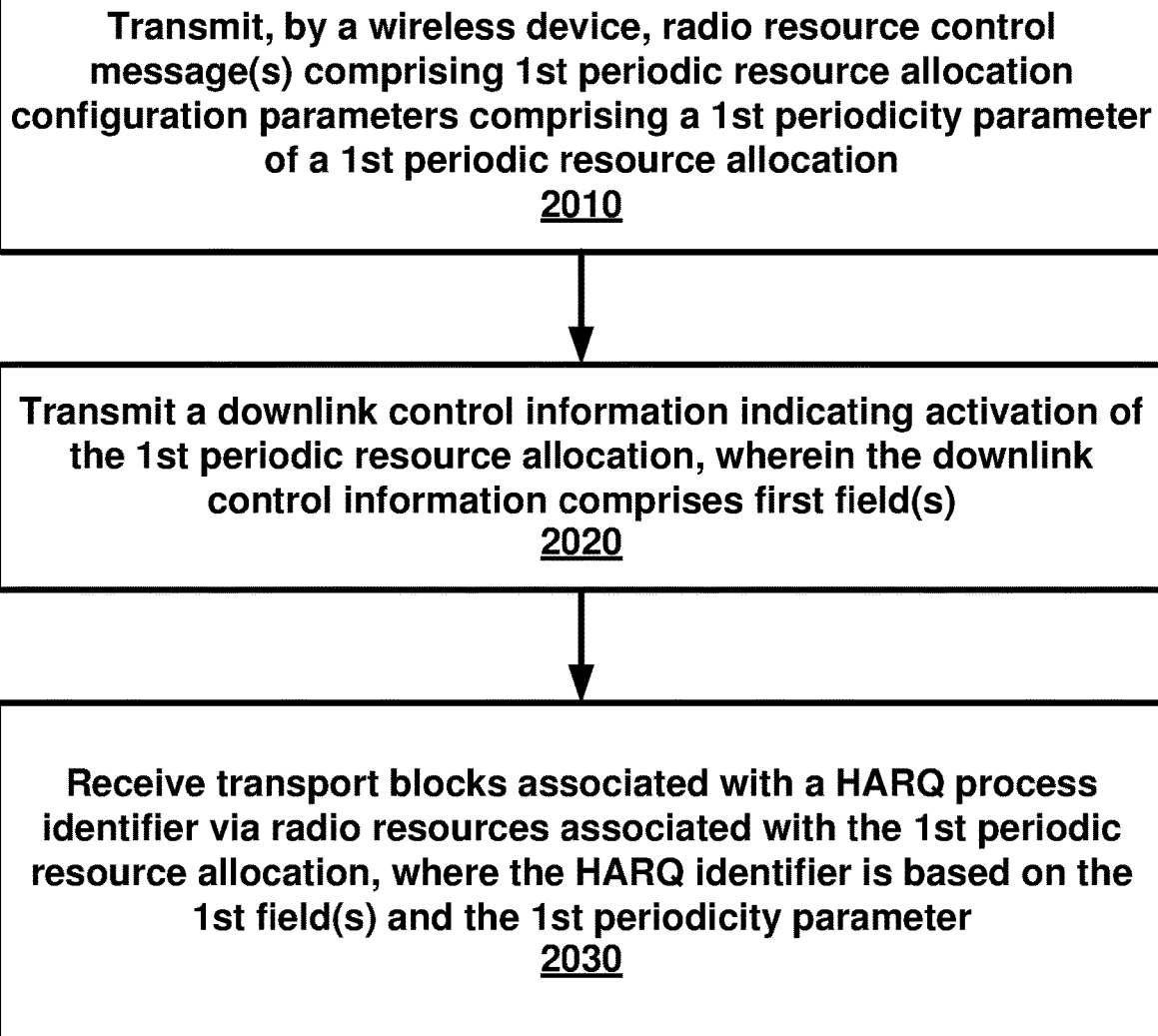
FIG. 20 is a flow diagram of an aspect of an embodiment of the present disclosure.

FIG. 20 is an example flow diagram as per an aspect of an embodiment of the present disclosure. At 2010, a base station may transmit one or more radio resource control messages. The one or more radio resource control messages may comprise first periodic resource allocation configuration parameters comprising a first periodicity parameter of a first periodic resource allocation. At 2020, downlink control information indicating activation of the first periodic resource allocation may be transmitted. The downlink control information may comprise one or more first fields. At 2030, a transport block associated with a hybrid automatic repeat request (HARQ) process identifier may be received via radio resources associated with the first periodic resource allocation. The HARQ identifier may be based on the one or more first field and the first periodicity parameter.

According to an embodiment, the one or more first fields may indicate a numerology, wherein the numerology may indicate a symbol duration. According to an embodiment, the first periodicity parameter indicates a number of symbols; the one or more first fields may indicate a symbol duration; and the time interval between two subsequent transmission occasions is based on the number of symbols multiplied with the symbol duration. According to an embodiment, the first periodic resource allocation configuration parameters may comprise a radio network temporary identifier. According to an embodiment, the downlink control information may be associated with the radio network temporary identifier. According to an embodiment, the downlink control information may indicate radio resources for transmission of the plurality of the transport block. According to an embodiment, the downlink control information comprises one or more second fields, the radio resources being determined based on one or more second fields. According to an embodiment, the downlink control information indicates one or more transmission durations up to a first value for transmission of the plurality of transport blocks. According to an embodiment, a transmission duration in the one or more transmission duration may correspond to one or more logical channels. According to an embodiment, the first periodicity parameter may indicate a number of transmission time intervals; the one or more first fields may indicate a transmission time interval duration; and the time interval between two subsequent transmission occasions may be based on the number of transmission time intervals multiplied with the transmission time interval duration.

Figure 21:
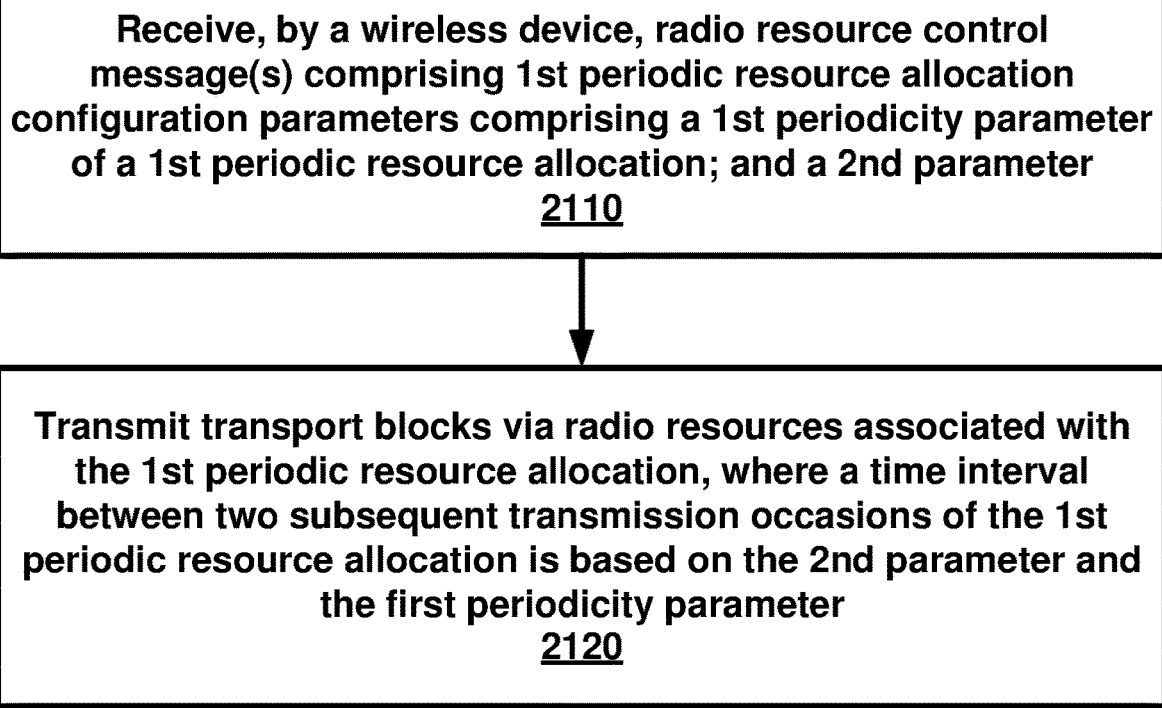
FIG. 21 is a flow diagram of an aspect of an embodiment of the present disclosure.

FIG. 21 is an example flow diagram as per an aspect of an embodiment of the present disclosure. At 2110, a wireless device receives one or more radio resource control messages. The one or more radio resource control messages may comprise first periodic resource allocation configuration parameters and a second parameter. The first periodic resource allocation configuration parameters may comprise a first periodicity parameter of a first periodic resource allocation. At 2120, a plurality of transport blocks may be transmitted via radio resources associated with the first periodic resource allocation. A time interval between two subsequent transmission occasions of the first periodic resource allocation may be based on the second parameter and the first periodicity parameter.

According to an embodiment, the first periodicity parameter indicates a number of symbols; the second parameter indicate a symbol duration; and the time interval between two subsequent transmission occasions is based on the number of symbols multiplied with the symbol duration. According to an embodiment, the first periodicity parameter indicates a number of transmission time intervals; the second parameter indicates a transmission time interval duration; and the time interval between two subsequent transmission occasions is based on the number of transmission time intervals multiplied with the transmission time interval duration.

FIG. 22 is an example flow diagram as per an aspect of an embodiment of the present disclosure. At 2210, a base station transmits one or more radio resource control messages. The one or more radio resource control messages may comprise first periodic resource allocation configuration parameters and a second parameter. The first periodic resource allocation configuration parameters may comprise a first periodicity parameter of a first periodic resource allocation. At 2220, a plurality of transport blocks may be received via radio resources associated with the first periodic resource allocation. A time interval between two subsequent transmission occasions of the first periodic resource allocation may be based on the second parameter and the first periodicity parameter.

According to an embodiment, the first periodicity parameter indicates a number of symbols; the second parameter indicate a symbol duration; and the time interval between two subsequent transmission occasions is based on the number of symbols multiplied with the symbol duration. According to an embodiment, the first periodicity parameter indicates a number of transmission time intervals; the second parameter indicates a transmission time interval duration; and the time interval between two subsequent transmission occasions is based on the number of transmission time intervals multiplied with the transmission time interval duration.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

The invention claimed is:

1. A method comprising:
    receiving, by a wireless device, a radio resource control message comprising a periodicity parameter indicating a number of symbols for a periodic resource allocation;
    receiving a downlink control information indicating activation of the periodic resource allocation, wherein the downlink control information comprises one or more fields indicating a numerology, wherein the numerology indicates a symbol duration; and
    transmitting transport blocks via resources associated with the periodic resource allocation, wherein a time interval between two subsequent transmission occasions of the periodic resource allocation is determined based on the symbol duration and the number of symbols.

2. The method of claim 1, wherein the time interval between the two subsequent transmission occasions is determined based on the number of symbols multiplied with the symbol duration.

3. The method of claim 1, wherein the radio resource control message comprises a radio network temporary identifier.

4. The method of claim 3, wherein the downlink control information is associated with the radio network temporary identifier.

5. The method of claim 1, wherein the downlink control information indicates the resources for the transmitting of the transport blocks.

6. The method of claim 5, wherein the downlink control information comprises one or more second fields, the resources being determined based on one or more second fields.

7. The method of claim 1, wherein the downlink control information indicates one or more transmission durations up to a first value for transmission of the transport blocks.

8. The method of claim 7, wherein a transmission duration in the one or more transmission durations corresponds to one or more logical channels.

9. The method of claim 1, wherein:
the periodicity parameter indicates a number of transmission time intervals;
the one or more fields indicate a transmission time interval duration; and
the time interval between the two subsequent transmission occasions is determined based on the number of transmission time intervals multiplied with the transmission time interval duration.

10. A wireless device comprising:
one or more processors; and
memory storing instructions that, when executed by the one or more processors, cause the wireless device to:
receive a radio resource control message comprising a periodicity parameter of a periodic resource allocation indicating a number of symbols for a periodic resource allocation;
receive a downlink control information indicating activation of the periodic resource allocation, wherein the downlink control information comprises one or more fields indicating a numerology, wherein the numerology indicates a symbol duration; and
transmit transport blocks via resources associated with the periodic resource allocation, wherein a time interval between two subsequent transmission occasions of the periodic resource allocation is determined based on the symbol duration and the number of symbols.

11. The wireless device of claim 10, wherein the time interval between the two subsequent transmission occasions is determined based on the number of symbols multiplied with the symbol duration.

12. The wireless device of claim 10, wherein the radio resource control message comprises a radio network temporary identifier.

13. The wireless device of claim 12, wherein the downlink control information is associated with the radio network temporary identifier.

14. The wireless device of claim 10, wherein the downlink control information indicates the resources for the transmitting of the transport blocks.

15. The wireless device of claim 14, wherein the downlink control information comprises one or more second fields, the resources being determined based on one or more second fields.

16. The wireless device of claim 10, wherein the downlink control information indicates one or more transmission durations up to a first value for transmission of the transport blocks.

17. The wireless device of claim 16, wherein a transmission duration in the one or more transmission durations corresponds to one or more logical channels.

18. The wireless device of claim 10, wherein:
the periodicity parameter indicates a number of transmission time intervals;
the one or more first indicate a transmission time interval duration; and
the time interval between the two subsequent transmission occasions is determined based on the number of transmission time intervals multiplied with the transmission time interval duration.

* * * * *